United States Patent
Parker et al.

(10) Patent No.: US 10,717,514 B2
(45) Date of Patent: Jul. 21, 2020

(54) INTEGRATED DRAIN MAST STRUCTURE

(71) Applicant: Senior IP GmbH, Schaffhausen (CH)

(72) Inventors: Matthew J. Parker, Redondo Beach, CA (US); Shailesh N. Mistry, Chatsworth, CA (US); Eric M. Possert, Pacoima, CA (US)

(73) Assignee: Senior IP GmbH, Schaffhausen (CH)

( * ) Notice: Subject to any disclaimer, the term of this patent is extended or adjusted under 35 U.S.C. 154(b) by 313 days.

(21) Appl. No.: 15/917,269

(22) Filed: Mar. 9, 2018

(65) Prior Publication Data
US 2019/0276131 A1    Sep. 12, 2019

(51) Int. Cl.
*B64C 1/14*      (2006.01)
*B64D 29/00*    (2006.01)

(52) U.S. Cl.
CPC ............ *B64C 1/1453* (2013.01); *B64D 29/00* (2013.01)

(58) Field of Classification Search
CPC .............................. B64C 1/1453; B64D 29/00
See application file for complete search history.

(56) References Cited

U.S. PATENT DOCUMENTS

| | | | |
|---|---|---|---|
| 2,908,037 A | 10/1959 | Harkenrider | |
| 5,290,996 A * | 3/1994 | Giamati | B64C 1/1453 219/201 |
| 8,328,504 B2 * | 12/2012 | Russell | B64D 29/00 244/129.1 |
| 9,452,833 B2 | 9/2016 | Montero et al. | |
| 9,453,595 B2 | 9/2016 | Velarde et al. | |
| 9,664,542 B2 | 5/2017 | Gordon et al. | |
| 9,688,378 B2 | 6/2017 | Wielgosz | |
| 2002/0056789 A1 * | 5/2002 | Jones | B64C 1/1453 244/129.1 |
| 2006/0060712 A1 * | 3/2006 | Hoffjann | B64C 1/1453 244/136 |
| 2009/0133376 A1 * | 5/2009 | Zysman | B64C 1/1453 60/39.08 |
| 2011/0121137 A1 * | 5/2011 | Sandiford | B64C 1/1453 244/136 |

(Continued)

FOREIGN PATENT DOCUMENTS

| | | |
|---|---|---|
| DE | 102008025869 A1 | 5/2008 |
| FR | 2952713 A1 | 5/2011 |
| GB | 2452026 B | 5/2010 |

OTHER PUBLICATIONS

Photograph from website: https://aviation.stackexchange.com/questions/35000/what-is-the-function-of-the-protruding-outlet-on-the-trent-xwb.

*Primary Examiner* — Philip J Bonzell
*Assistant Examiner* — Tye William Abell
(74) *Attorney, Agent, or Firm* — Greenberg Traurig, LLP

(57) ABSTRACT

An integrated drain mast structure for use in draining fluids emanating from aircraft components, such as turbine engines and fuselages, for facilitating the detection of fluids leaking from said components. A self-supporting tube section including a plurality of generally aligned fluid passages each having a peripheral wall, at least a portion of which is common with at least a portion of another aligned adjacent fluid passage is connected to one or more of these aircraft components. An aerodynamic fairing includes a plurality of fairing fluid passages each connected to a respective fluid passage of the tube section and having respective fluid outlets. The tube section and fairing section can comprise a single integral structure.

25 Claims, 18 Drawing Sheets

(56) References Cited

U.S. PATENT DOCUMENTS

| | | | |
|---|---|---|---|
| 2012/0286095 A1* | 11/2012 | Giamati | B64C 1/1453 244/136 |
| 2014/0183392 A1 | 7/2014 | Hudon et al. | |
| 2015/0075662 A1 | 3/2015 | Lee et al. | |
| 2016/0348531 A1* | 12/2016 | Rice | F01D 17/08 |
| 2016/0376931 A1* | 12/2016 | Leon | B64C 1/1453 137/557 |
| 2017/0030941 A1 | 2/2017 | Samo et al. | |

* cited by examiner

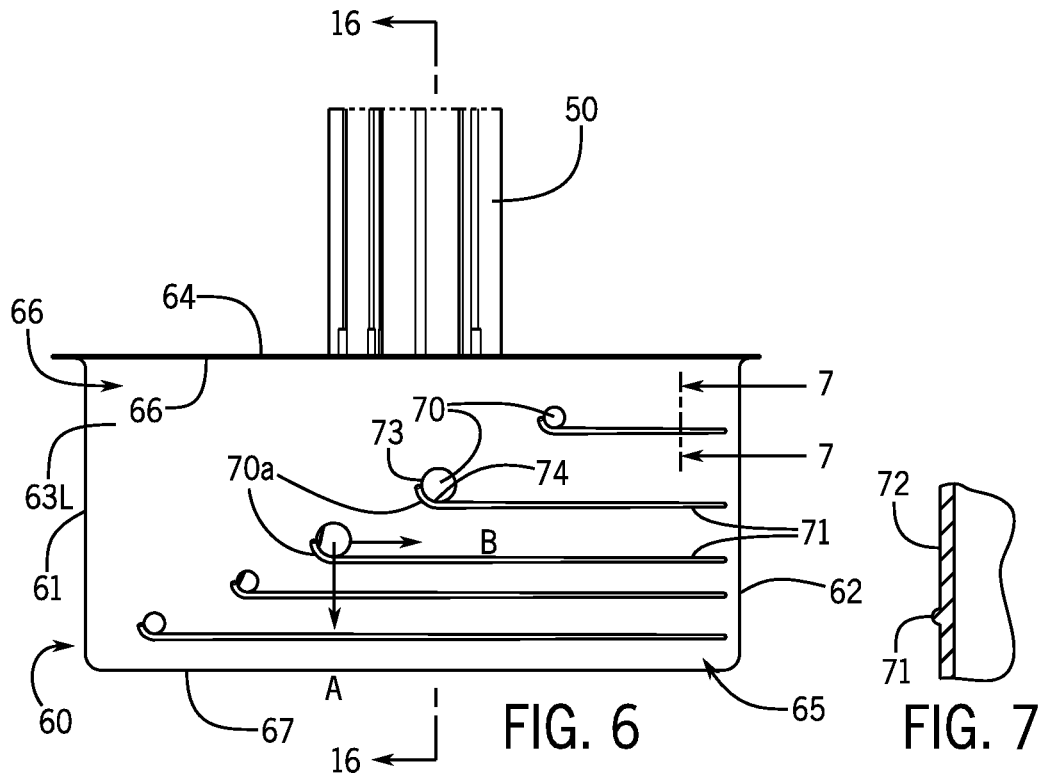
FIG. 6
FIG. 7
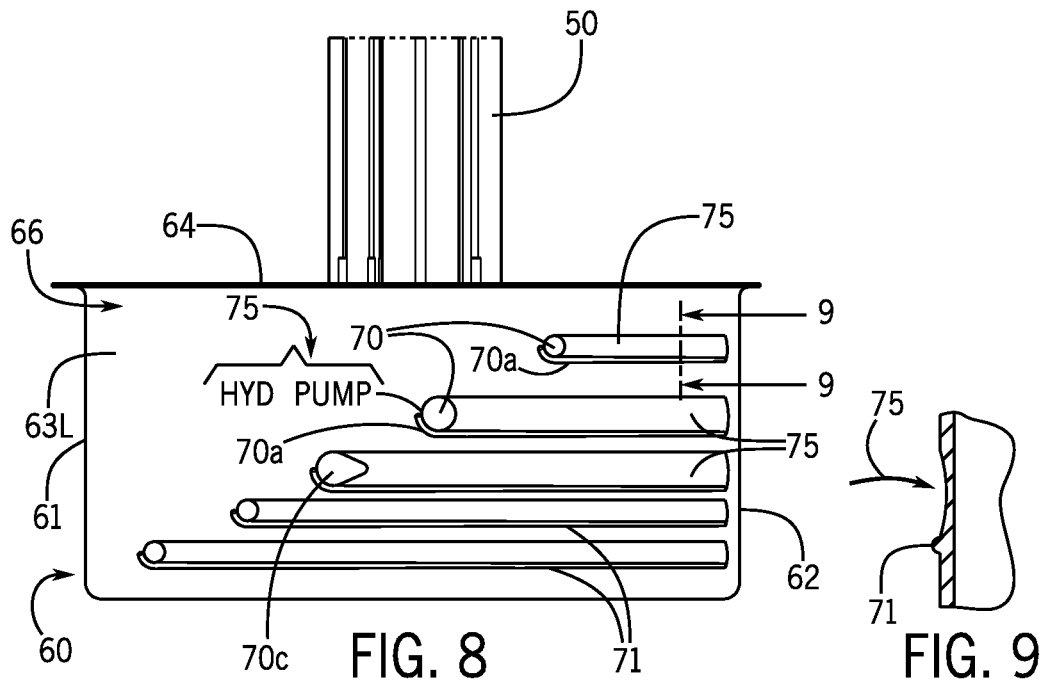
FIG. 8
FIG. 9

INTEGRATED DRAIN MAST STRUCTURE

FIELD OF THE INVENTION

The present invention relates to aircraft components from which fluids are drained, including gas turbine engines used in aircraft. In the case of gas turbine engines, an integrated drain mast structure is used to drain fluids emanating from various gas turbine engine components, and to facilitate the detection of fluids leaking from those components. Drain mast structures can also be used in conjunction with the fuselage of an aircraft to also facilitate fluid drainage, together with the detection and identification of the nature of those fluids.

BACKGROUND OF THE INVENTION

Gas turbine engines used in modern aircraft are complex pieces of equipment whose proper operation and reliability are essential to safe flight. Modern gas turbine engines incorporate critical components which often generate, convey, consume and/or contain fluids. For example, components, such as fuel pumps and hydraulic pumps, distribute and control the flow of jet fuel and hydraulic fluid, respectively; components, such as oil tanks, store fluid; and components, such as starter motors, gear boxes, actuators, compressors, generators and the like, require a supply of lubricants—all of which fluids have the potential to leak or overflow from their respective components or reservoirs.

The detection of fluid leaking from a turbine engine may indicate that an engine component has failed or is likely to fail in the near future, if no action is taken. Providing an outlet for leaking fluids is a preferred design consideration in lieu of permitting leaking fluid to collect in and around the turbine engine potentially concealing other issues and/or triggering other failures.

Accordingly, aircraft turbine engines typically include multiple drain lines each connected to a specific engine component in order to provide an outlet for fluids that may leak or overflow therefrom, as well as to provide for the early detection of leaks that may indicate a potential maintenance or other critical engine operating condition. In a typical prior art design, each of the individual drain lines are typically routed from individual engine components alongside the turbine engine to a central single location, toward permitting any leaking fluid to exit through a plurality of outlet ports provided in a fairing structure extending from the engine cowling. Each of the drain lines are typically secured to a support structure or mast positioned within the engine cowling, using brackets and fasteners toward preventing undesired movement, fatigue and/or breakage of the drain lines. Each fluid drain line is, in turn, connected by fittings to a drain fairing assembly that is joined to the support structure, also using mounting plates, brackets and fasteners. The fairing projects outwardly from and is secured to the engine cowling.

As part of normal aircraft operation, ground personnel and pilots typically perform, and in many cases are required to perform, a visual inspection of critical portions of the aircraft to identify any obvious conditions that may negatively impact flight safety. The drain line fairing assembly of an aircraft engine, being among many critical aircraft components, is subject to particular attention. A visual pre-flight inspection of the drain line fairing may reveal fluids leaking from the engine which may be an indication of a critical component failure or an indication of a potential future failure—each of which may result in engine failure leading to a potentially catastrophic result.

By way of example, a pre-flight inspection may reveal the presence of fluid dripping from or accumulated on the fairing. While multiple drain outlets are provided in the fairing, in some cases it may be difficult to confirm from which outlet any one or more fluids leaked, making identification of the engine component requiring attention difficult, if not impossible.

Likewise, apart from the engine, there are other components in an aircraft that also require fluid draining, together with fluid detection and identification. These would include aircraft sink drains and ice storage bins that could likewise benefit from an improved integrated drain mast assembly positioned along the bottom of an aircraft fuselage.

Regardless of whether addressing fluid drainage from an engine cowling or a fuselage, the disadvantages of such a prior art drain assembly designs include: the need to source, track and inventory a large number of individual components that must be assembled together to form a complete drain line assembly that is secure enough, and strong enough, to withstand vibration and the external forces that bear upon such structures during flight; the collective weight of all of the individual components; the time required to assemble, route and secure each of the individual drain lines to the support structure, brackets, plates and fairing; and finally the time required to install the finished assembly in the aircraft.

In view of at least the foregoing, there is a demonstrable need for an improved drain mast structure as presently disclosed herein.

SUMMARY OF THE INVENTION

In one embodiment of the present invention, an integrated drain mast structure for draining fluids from an aircraft enclosure comprises a self-supporting tube section intended to be positioned within the aircraft together with a substantially aerodynamic fairing intended for positioning within an airstream. Preferably, the tube section and fairing comprise a single integral structure, and in one embodiment the tube section and fairing are additively manufactured from metal to form a single integrated homogeneous structure.

The tube section includes a plurality of generally aligned fluid passages extending from an upper end of the tube section to a lower end of the tube section with each fluid passage having a peripheral surface of substantially equal thickness throughout the self-supporting tube section, at least a portion of which surface is common with a portion of a peripheral surface of at least one other aligned fluid passage. The upper end of each fluid passage within the tube section is configured to be in fluid communication with one or more sources of fluid, respectively. The cross sectional area of the self-supporting tube section substantially corresponds to the collective width of the plurality of generally aligned fluid passages, so as to minimize said cross sectional area. Preferably, the plurality of fluid passages within the tube section may be orientated with respect to one another so as to increase the tube section's structural resistance to vibration and other external forces that may bear upon the tube section when the aircraft is in flight. In one embodiment of the invention, the respective peripheral walls separating the adjacent fluid passages toward the upper end of the tube section and toward the lower end of the tube section are thicker than the respective peripheral walls separating said adjacent fluid passages in the region therebetween, so as to create a concave or "hourglass" profile further enhancing the tube section's structural resistance to vibration and other external forces.

The fairing includes a plurality of fairing fluid passages, each connected at their upper end to a respective fluid passage at the lower end of the tube section. In this embodiment of the invention, each fairing fluid passage is connected at their lower end, to a respective one of a plurality of fluid outlets located in the fairing section. In one embodiment of the present integrated drain mast the aircraft enclosure comprises an aircraft engine cowling surrounding an aircraft engine, wherein the self-supporting tube section is positioned within the area encased by the engine cowling. The fairing includes a flange that may be positioned substantially flush with the lower exterior facing surface of the engine cowling, which extends outwardly from the engine cowling into the airstream. In another embodiment of the invention the aircraft enclosure is the aircraft fuselage itself—in which the integrated drain mast enables the drainage of inner or outer cabin fluids, and is attached to the lower exterior surface of the fuselage.

In either of the preferred embodiments, a plurality of upstream fluid conduits where aircraft fluids are initially collected or originated are each connected at one end to the upper end of a respective fluid passage within the tube section. To enable connection of the upper ends of the tube section passages to respective ones of the fluid conduits, the upper end of the tube section includes a branch structure, wherein the plurality of tube section passages separate from one another to facilitate connection to a respective associated fluid conduit, in which the fluid conduits are telescopically received by the branch structure and connected thereto each respective passage by, for example, brazing, welding, or mechanical coupling such as threading. The fluid passages within the tube section may be sized to accommodate an amount of fluid that is likely to be produced by a respective source of fluid, such as required by a particular, associated aircraft engine component.

The fairing includes an aerodynamic leading surface, a trailing surface and opposing side surfaces. In one embodiment of the fairing, the fairing fluid outlets are positioned on both fairing side surfaces. The fairing in one embodiment further includes at least one fluid ridge associated with a respective one of at least one fluid outlet, where the fluid ridge is positioned adjacent to a lower edge of a fluid outlet and extends rearwardly, in a substantially horizontal or aerodynamic, downwardly angled orientation, along the side of the fairing and further extends along at least a portion of the leading edge of the at least one fluid outlet. Alternatively, the fluid outlet itself may be given a teardrop or other aerodynamic geometry. In yet another embodiment of the present integrated drain mast structure the fairing includes at least one groove associated with at least one fluid outlet where the groove extends from the trailing edge of a respective fluid outlet rearwardly along the side of the fairing, toward the trailing surface of the fairing.

In another embodiment of the integrated drain mast structure, the plurality of fluid outlets are positioned on only one side of the fairing, and are orientated diagonally from the lower leading edge of the fairing section to the upper trailing edge of the fairing. Indicia associated with and identifying an engine component may optionally be placed adjacent any one or more of the fluid outlets.

The foregoing summary is illustrative only and is not intended to be in any way limiting. In addition to the illustrative aspects, embodiments, and features described above, further aspects embodiments, and features will become apparent by reference to the figures, the following detailed description and the accompanying drawings and claims.

BRIEF DESCRIPTION OF THE DRAWINGS

The accompanying drawings are provided to help further understanding of the present invention, and constitute a part of the description. These drawings are used in conjunction with the embodiments to interpret the present invention, but do not constitute any limitations to the present invention. In the figures:

FIG. 6 is a left side elevational view of the fairing of FIG. 4 according to the present invention.

FIG. 7 is a cross sectional view of a fragment of the fairing according to the present invention, taken along lines 7-7 of FIG. 6, and looking in the direction of the arrows.

FIG. 8 is a left side elevational view of the fairing according to another embodiment of the present invention.

FIG. 9 is a cross sectional view of a fragment of the embodiment of FIG. 8, taken along lines 9-9 of FIG. 8, and looking in the direction of the arrows.

DETAILED DESCRIPTION OF THE DRAWINGS

Several preferred embodiments of the present invention will be described herewithin, with reference to the accompanying drawings. In other instances, well known methods and structures have not been described in detail so as to not unnecessarily obscure the description. It should be appreciated that the embodiments described here are provided to only describe and interpret the present invention, but do not constitute any limitations to the present invention.

Figure 1:
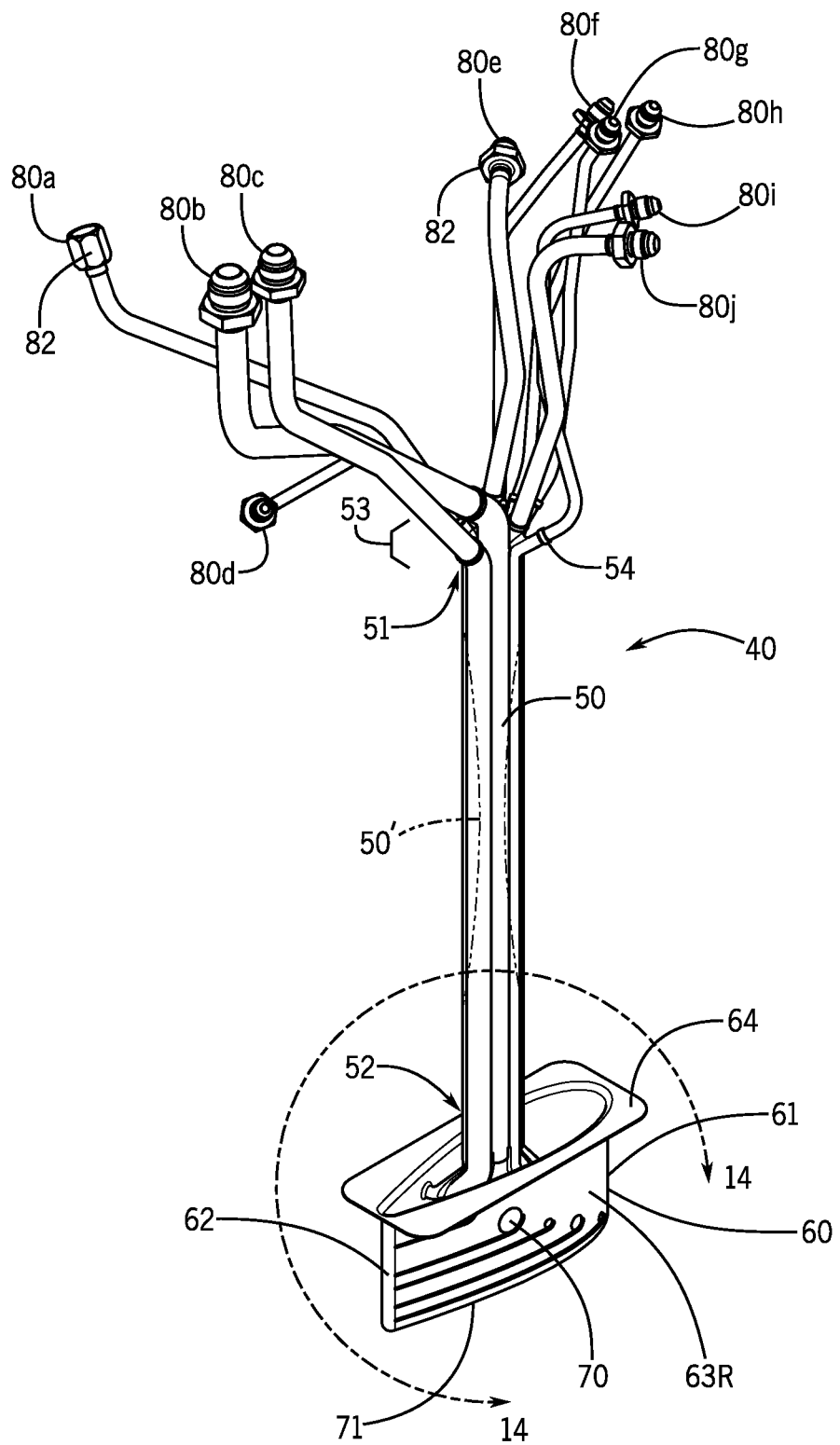
FIG. 1 is a perspective view of an integrated drain mast structure according to one embodiment of the present invention, illustrating the integrated drain mast structure, the tube section with its internal fluid passages, and the fairing, with fluid outlets positioned on the right side of the fairing.
Figure 2:
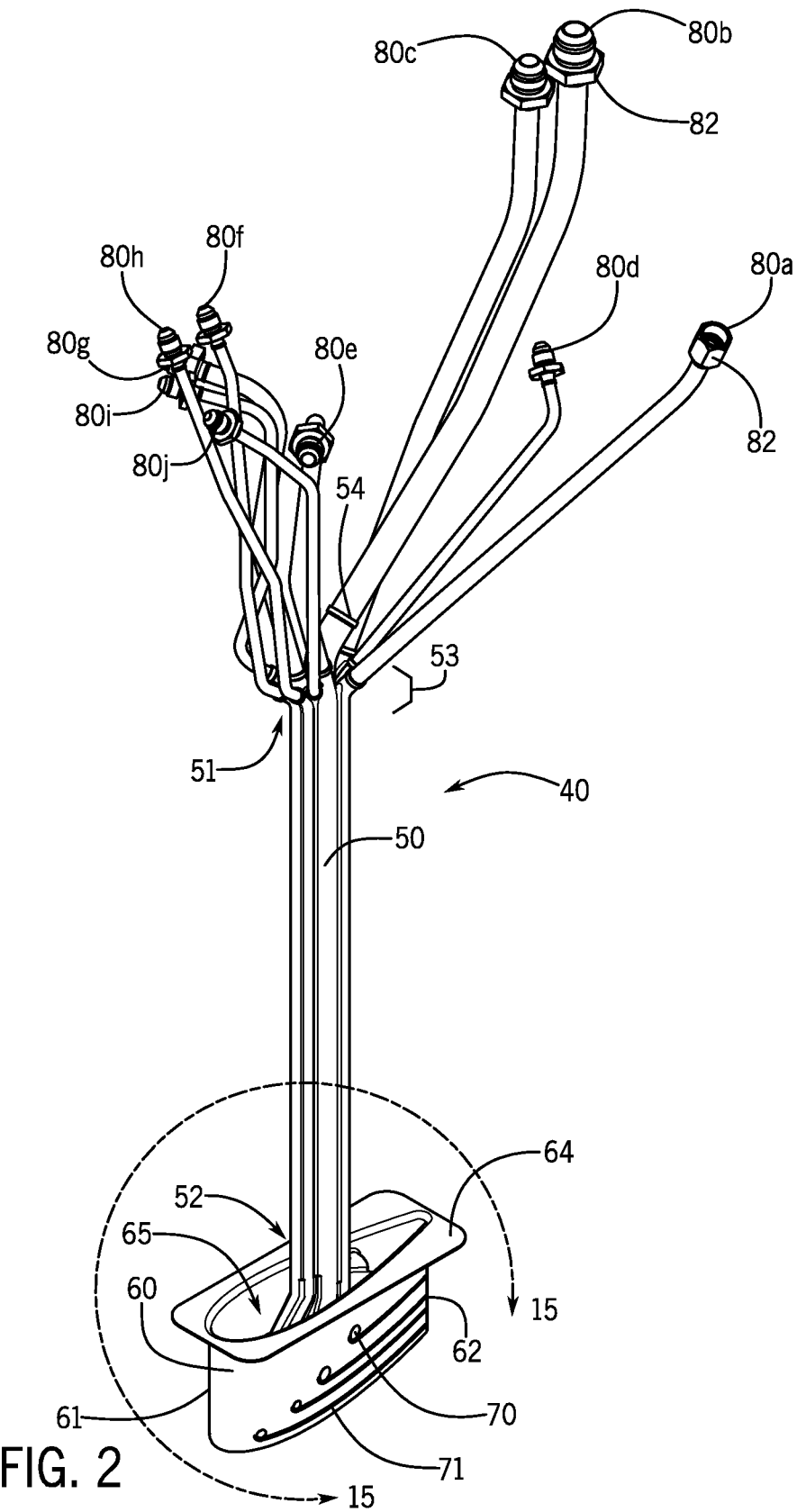
FIG. 2 is a perspective view of an integrated drain mast structure according to one embodiment of the present invention, illustrating the integrated drain mast structure, the tube section with its internal fluid passages, and the fairing, with fluid outlets positioned on the left side of the fairing.
Figure 5:
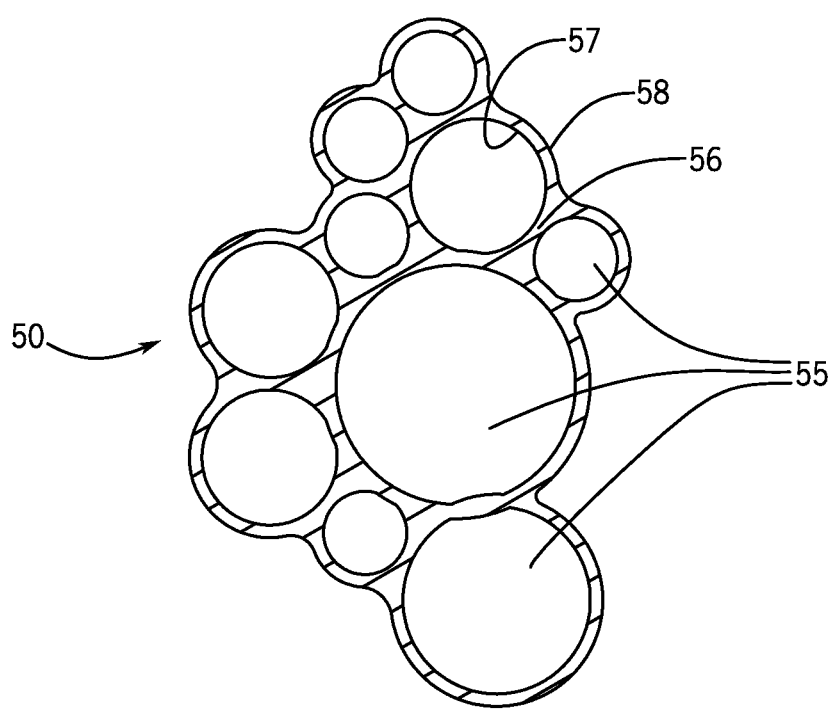
FIG. 5 is a cross sectional view illustrating the interior of the tube section according to the present invention, taken along lines 5-5 of FIG. 4, and looking in the direction of the arrows.

FIGS. 1 and 2 of the drawings illustrate a first embodiment of the integrated design mast structure 40 of the present invention and, in particular, a light-weight, self-supporting tube section 50 and fairing 60. Tube section 50 is intended to be installed within the space enclosed by an aircraft engine or fuselage. In use on the bottom an aircraft engine cowling, fairing 60 extends through the aircraft engine cowling for positioning in the airstream. Tube section 50 comprises a unitary structure including plurality of generally aligned fluid passages 55 (as shown in FIG. 5) extending from upper end 51 to lower end 52 of tube section 50. Substantially aerodynamic fairing 60 includes a plurality of fairing fluid passages 90 (as shown in FIGS. 14-18) each of which fairing fluid passages 90 is in operable fluid communication with a corresponding fluid passage 55 of tube section 50. Fairing 60 includes leading surface 61, trailing surface 62 and fluid outlets 70 located along both right side wall 63R and left side wall 63L. Also shown in FIGS. 1 and 2 is fairing mounting flange 64. Tube section 50 and fairing 60 comprise a single integrated structure. While the embodiments of the invention illustrated herein depict fairing 60 as having a substantially teardrop shape, other aerodynamic shapes are deemed within the scope of the present invention. Moreover, in one embodiment of the invention, the respective peripheral walls separating the adjacent fluid passages toward the upper end of the tube section and toward the lower end of the tube section are thicker than the respective peripheral walls separating said adjacent fluid passages in the region therebetween the upper and lower ends, so as to create a concave or "hourglass" profile, further enhancing the tube section's structural resistance to vibration and other external forces, as shown by tube section 50'.

According to a preferred embodiment of the invention integrated drain mast structure 40 is intended to be additively manufactured, toward providing a self-supporting, light-weight, integrated structure that minimizes the number of components, that omits the need for separate support masts, brackets and fasteners, that can withstand vibration and the external forces produced by different particular aircraft engines or fuselage components—, and that can be easily and quickly installed. Specifically, tube section 50 and fairing 60 may preferably be additively manufactured out of metal, such as Titanium Ti-6Al-4V (Grade 5), aluminum, or Inconel®, an alloy of nickel containing chromium and iron Such an additively manufactured integrated drain mast structure 40 is estimated to provide a 33% savings in weight over a conventional prior art design.

Fluid conduits 80a through 80j (referred to collectively as fluid conduits 80) are connected to respective fluid passages at the upper end 53 of tube section 50. The uppermost ends of fluid conduits 80a through 80j are configured to be connected to one or more sources of fluid associated with aircraft engine components via connectors, such as connector 82.

Figure 3:
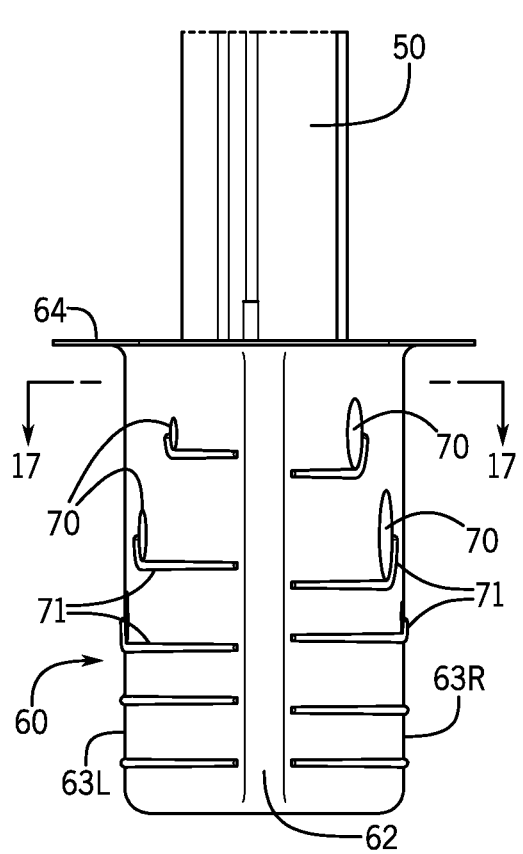
FIG. 3 is an enlarged rear elevational view of the trailing edge of the fairing, according to one embodiment of the present invention.
Figure 4:
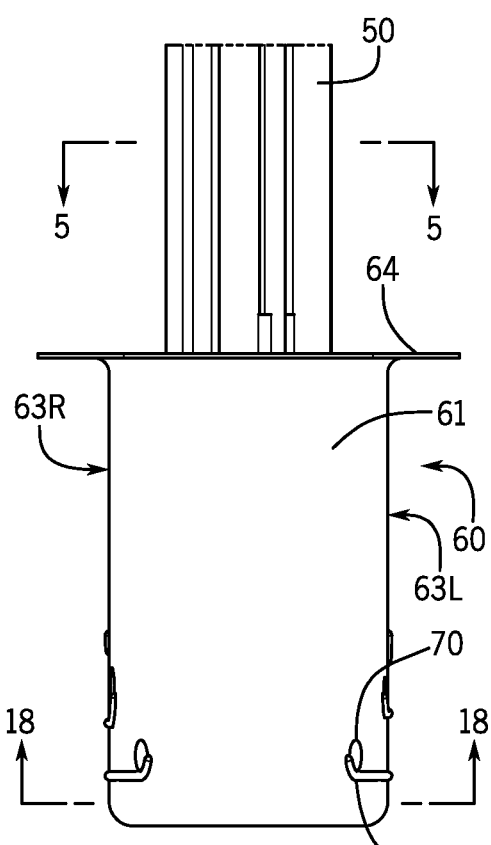
FIG. 4 is an enlarged front elevational view of the leading edge of the fairing according to one embodiment of the present invention.
Figure 11:
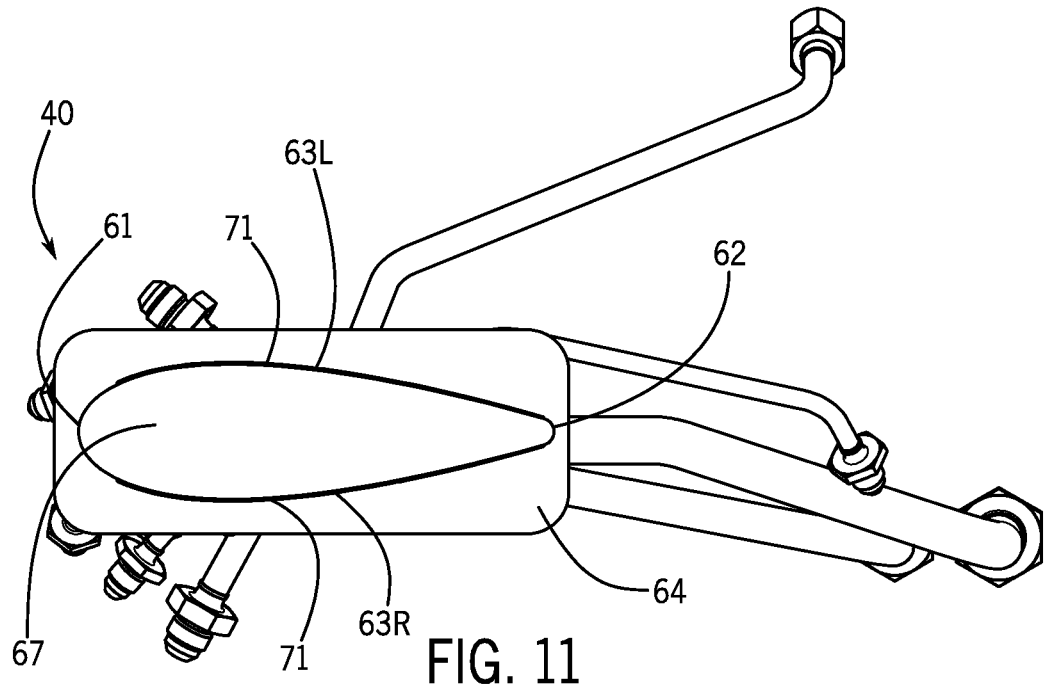
FIG. 11 is a bottom plan view of the integrated drain mast structure of FIG. 1.

FIGS. 3 and 4 are rear and forward elevational views of fairing 60, respectively. Fairing 60 includes a trailing surface 62 which, as as shown in FIG. 1, can have a substantially blunt or flat profile. Alternatively, as illustrated in FIG. 11, trailing surface 62 may have a substantially rounded or tapered profile. Leading surface 61 is typically curvilinear and aerodynamic.

As shown in FIG. 5, each fluid passage 55 has a peripheral surface 56 of substantially equal wall thickness range throughout the self-supporting tube section 50, wherein at least a portion of the peripheral surface of each fluid passage 55 is common with a portion of the peripheral surface 56 of at least one other aligned fluid passage 55. The peripheral surface of each fluid passage includes an interior wall 57 and an exterior surface 58. This self-supporting drain tube section 40 thus replaces the individual drain tubes and associated support structures, brackets and mounting hardware used in prior art designs. Tube section 50 is illustrated as having ten fluid passageways 55 of various internal diameters, each having a peripheral wall 56 common to at least two other adjacent aligned passageways. The individual passageways 55 vary as a formation of the drainage needs for any particular fluid. While the embodiment illustrated includes ten fluid passageways, the present invention can be configured to include either a fewer or greater number of passageways, depending upon the particular engine, or fuselage application. In the embodiment illustrated, fluid passageways 55 are arranged in an aligned fashion While each of the passageways 55 is sized to accommodate the fluid produced by an associated engine component, it will be appreciated that the arrangement of passageways 55, and in turn their respective peripheral walls 56, serves to provide a rigid, self-supporting structure that may be configured as needed, to resist vibration and any external forces and vibration that may be applied from one or more particular directions, upon the tube structure, during flight. At the same time, the collective, peripheral shape or "circumference" of tube section 50 is minimized to accommodate solely the dimensional needs of the collective passageways 55.

It will be appreciated that the "shared walled" construction illustrated in FIG. 5 and elsewhere in the drawings, provides a series of passageways 55 that are formed using less material and in a rigid, self-supporting structure that further obviates the need for any additional or separate supporting brackets or fixtures. While tube section 50 is depicted as a substantially linear section, tube section 50 may be formed with angles or curves as necessary to accommodate installation and/or the drainage needs of certain engine or fuselage components.

As disclosed in FIGS. 3, 4, and 6 through 9, in one preferred embodiment, fluid outlets 70 are positioned on both the right side 63R and left side 63L of fairing 60 in a staggered diagonal arrangement from bottom 67 to top 66, and from the leading edge 61 to the trailing edge 62, on both sides of fairing 60. Locating fluid outlets 70 in a staggered diagonal orientation along both the right and left sides of fairing 60 prevents any fluid that may leak from any single outlet from dripping downwardly in the direction of Arrow A, and potentially running on and into another fluid outlet which could otherwise occur if the outlets 70 were oriented in a purely vertical arrangement. Moreover, staggering the position of fluid outlets 70 from top 66 to bottom 65 further enhances the ability to detect any fluid leaking from any one outlet and to distinguish it from fluid leaking from any other outlet 70. Specifically, any fluid leaking emanating from outlet 70 will be blown toward the trailing edge 62 of fairing 60 as the aircraft is in flight, as illustrated by Arrow B. Any fluid emanating from any outlet 70 while the aircraft is stationary will most likely drip downwardly in the direction of Arrow A, leaving a line or steak traceable back to one particular fluid outlet 70. Accordingly, the illustrated arrangement enhances the ability to detect from which fluid outlet 70 one or more fluids may have emanated and, in turn, which engine or fuselage component requires maintenance or repair.

As highlighted in FIGS. 6-9, to further enhance the ability to detect the fluid outlet 70 from which any one or more fluids may have leaked, fluid ridges 71 are provided to protrude outwardly from the both the left and right faces 63R and 63R of fairing 60. In particular, fluid ridges 71 serve to enhance the collection of even small amounts of fluid that may emanate from a fluid outlet 70, so as to be more readily detectable by visual inspection.

In this embodiment of the invention, fluid ridges 71 are positioned immediately below each of lower edges 74 of each fluid outlet 70 and extend toward the trailing surface of fairing 60. Each fluid ridge further includes a forward section 70*a* that extends along the leading edge 73 of each fluid outlet 70. In another embodiment shown in FIG. 14, each fluid ridge 70 may be extend even further along the leading edge 73 of each fluid outlet 71 at 70*b* toward an upward swept ridge for each fluid outlet 70, to further enhance the collection of any fluid and prevent any fluid from traveling to an adjacent ridge or fluid outlet, otherwise frustrating the ability to detect the outlet from which fluid may have leaked and, in turn, to identify the aircraft engine component requiring maintenance. Fluid ridges 71 may be in a substantially horizontal orientation or in an aerodynamic, downwardly angled orientation. In an alternative embodiment of the invention, one or more fluid outlets 70*c* may be given an aerodynamic geometry, as shown in FIG. 8.

FIGS. 8 and 9 specifically illustrate a further embodiment of fairing 60 wherein channels 75 are extended from the trailing edge of each fluid outlet 70 towards the trailing surface 62 of fairing 60, thereby promoting the collection and retention of even small amounts of fluid that may emanate from any single fluid outlets 70, towards enhancing the ability to visually detect leaking fluids and, in turn, to visually identify associated engine or fuselage components requiring service or maintenance. In one embodiment, unique indicia or codes 76 may be formed adjacent each fluid outlet 70, to specifically detect and identify the engine component or system associated with each respective outlet 70.

Figure 10:
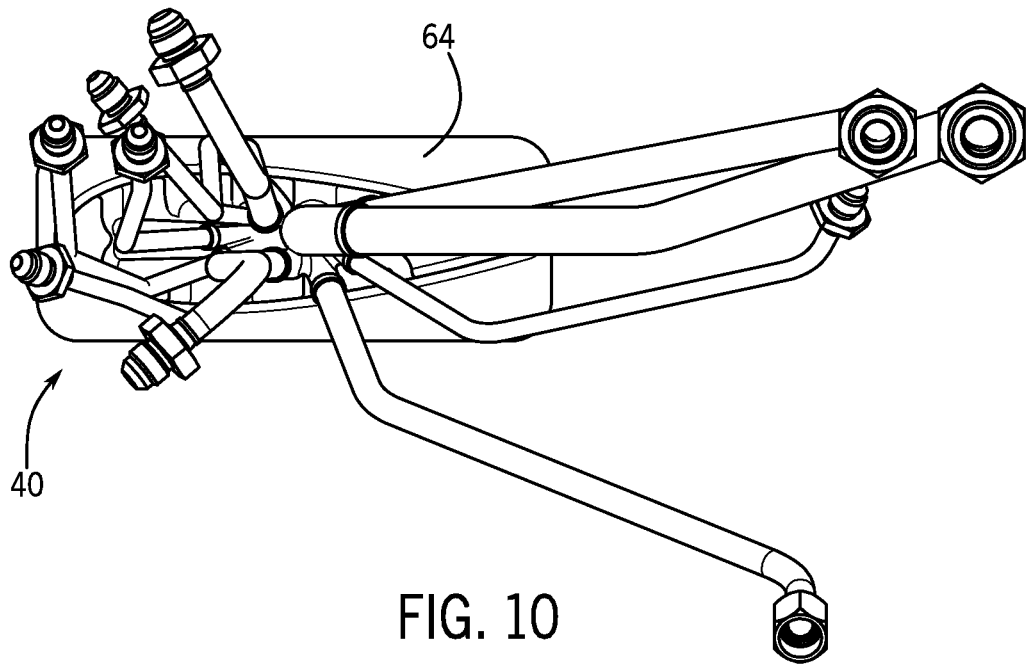
FIG. 10 is a top plan view of the integrated drain mast structure of Figure.

FIGS. 10 and 11 are top and bottom plan views, respectively, of one embodiment of the present integrated drain mast structure in which fluid outlets 70 are provided on both the left side 63L and right side 63R of fairing 60. FIG. 10 illustrates an arrangement of fluid conduits 80 with the free end of each positioned proximate the respective aircraft engine or fuselage component to which they are to be connected. It will be appreciated that fluid conduits 80 can be arranged in other configurations, as required, to accommodate and connect to aircraft engine or fuselage components whose locations typically vary from model to model. Moreover, it will be appreciated that fluid conduits of varying diameters may be utilized, depending upon the nature and type of each component and associated fluid to which they are to be connected for drainage. In one embodiment of the present invention, fluid conduits 80 range in diameter from ¼ inch to ¾ inches. FIG. 11 illustrates the aerodynamic shape of fairing 60 and leading and trailing surface 61 and 62, respectively, as well as location 71 of fluid ridges 70 on both the left side 63L and right side 63R of fairing 60. It will be appreciated that as an aircraft travels through the air, any fluids leaking from any one or more fluid outlets will be forced toward the trailing edge 62 of fairing 60.

Figure 12:
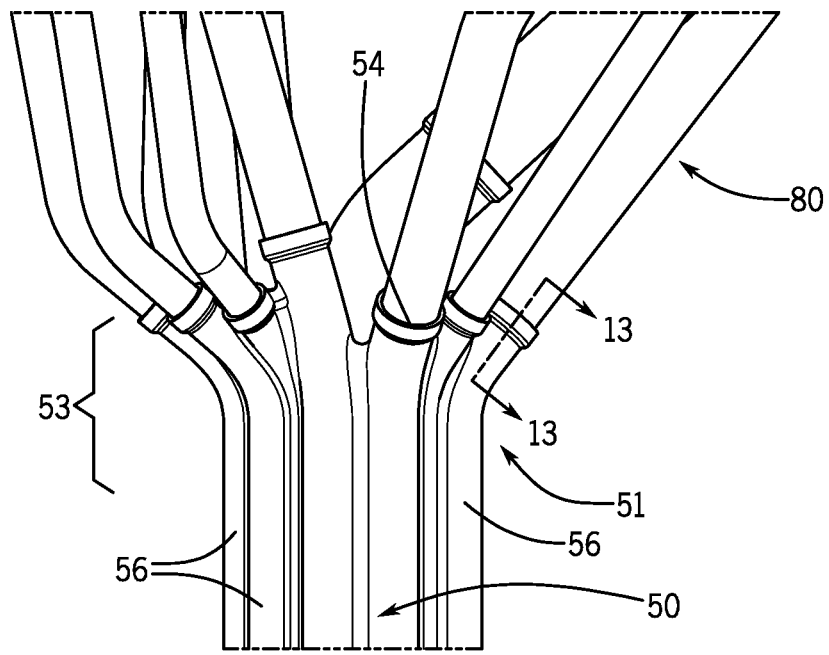
FIG. 12 is an elevated left side view of the upper portion of the tube structure according to one embodiment of the present invention.
Figure 13:
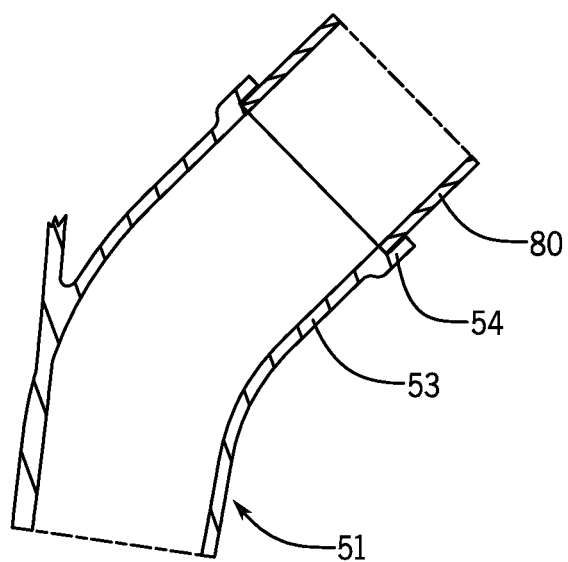
FIG. 13 is a cross sectional partial view illustrating the connection between a fluid conduit and one passage of the upper portion of the tube section according to the present invention, taken along lines 13-13 of FIG. 12, and looking in the direction of the arrows.

FIG. 12 of the drawings is a side elevational view of top portion 51 of tube section 50 illustrating branch section 53. As illustrated, outer peripheral walls 56 of each passageway 55 extend in an outward direction from the central axis of tube section 50, such that the peripheral walls 56 of each passageway are no longer common to one another. The uppermost edge of each first end includes collar 54, used to telescopically receive a fluid conduit 80, as shown in FIG. 13. The flared arrangement in the branch section 53 of the upper end of tube section 50 serves to facilitate the restrained connection of the individual fluid conduits 80*a* through 80*j* to a respective fluid conduit passageway 55, such as for example by brazing, welding, or mechanical coupling such as threading. This arrangement further assists and optimizes the routing of the respective fluid conduits 80 from their upper end at each engine or fuselage component to their lower end, where each is joined to a respective fluid passage in tube section 50.

Figure 14:
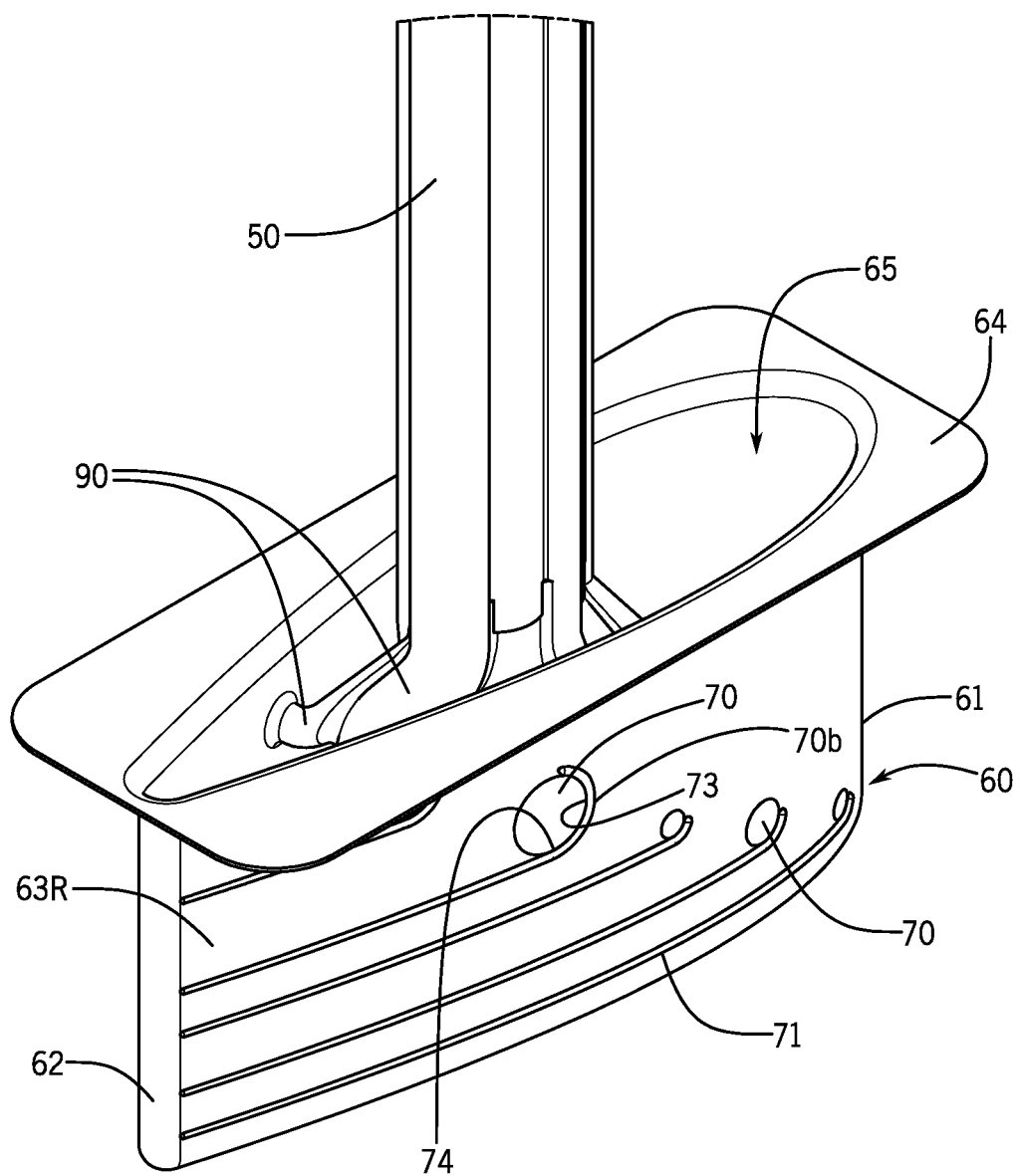
FIG. 14 is a right side perspective view of one embodiment of the fairing according to the present invention.

FIG. 14 is an enlarged perspective view of right side 63R of fairing 60. Fairing 60 includes leading surface 61 and a trailing surface 62, which in the embodiment illustrated has a generally tapered or rounded configuration.

Figure 15:
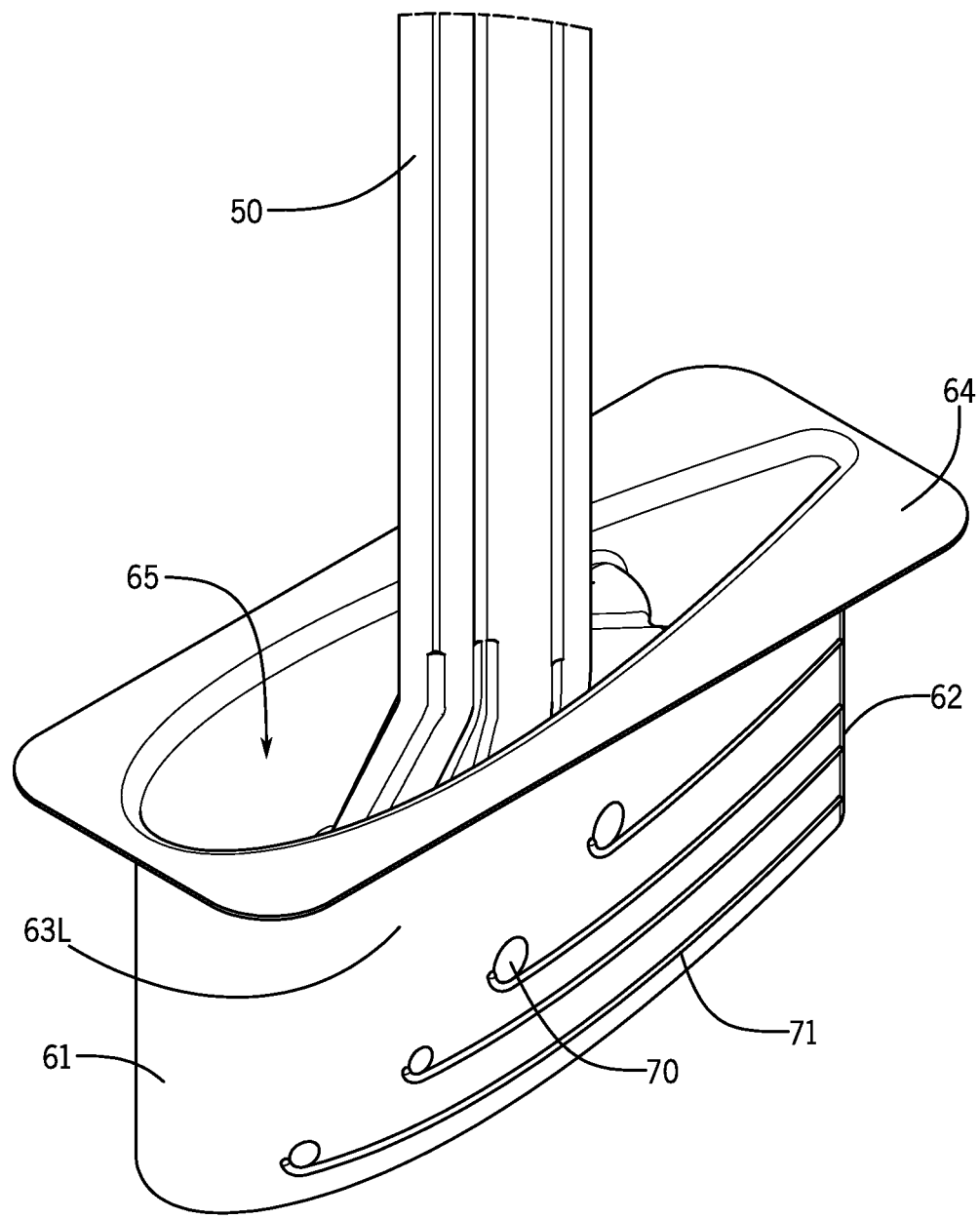
FIG. 15 is a left side perspective view of one embodiment of the fairing according to the present invention.
Figure 16:
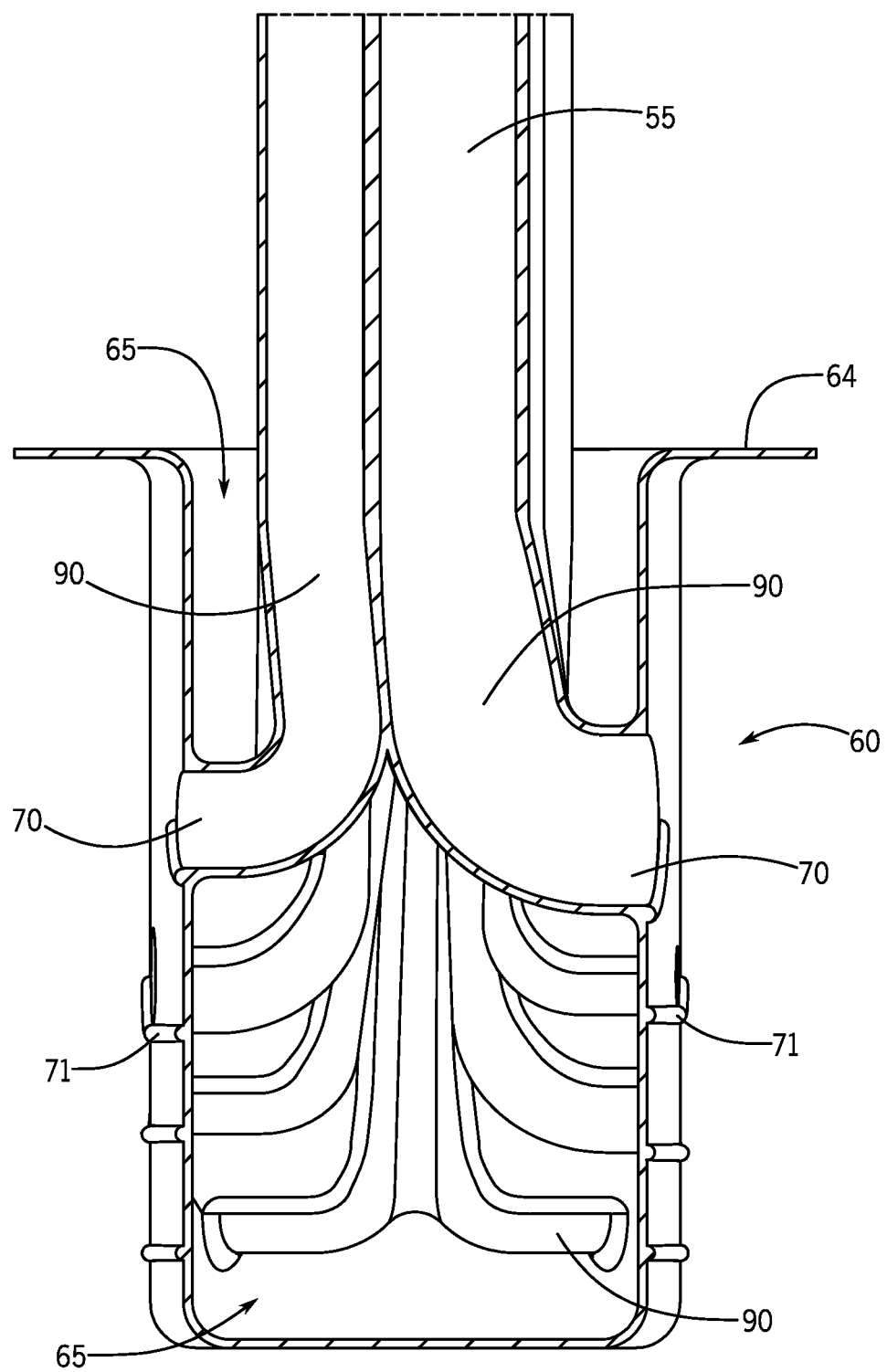
FIG. 16 is an elevated front cross sectional view of the fairing of FIG. 1 according to the present invention, taken along lines 16-16 of FIG. 6, and looking in the direction of the arrows.
Figure 17:
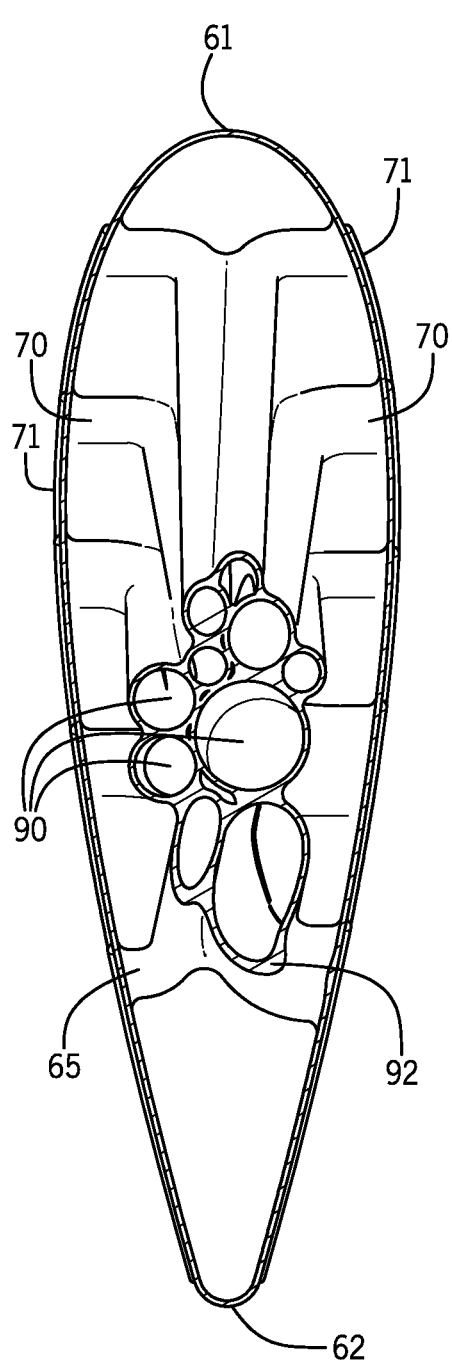
FIG. 17 is a top plan sectional view of the fairing according to the present invention, taken along lines 17-17 of FIG. 3, and looking in the direction of the arrows.
Figure 18:
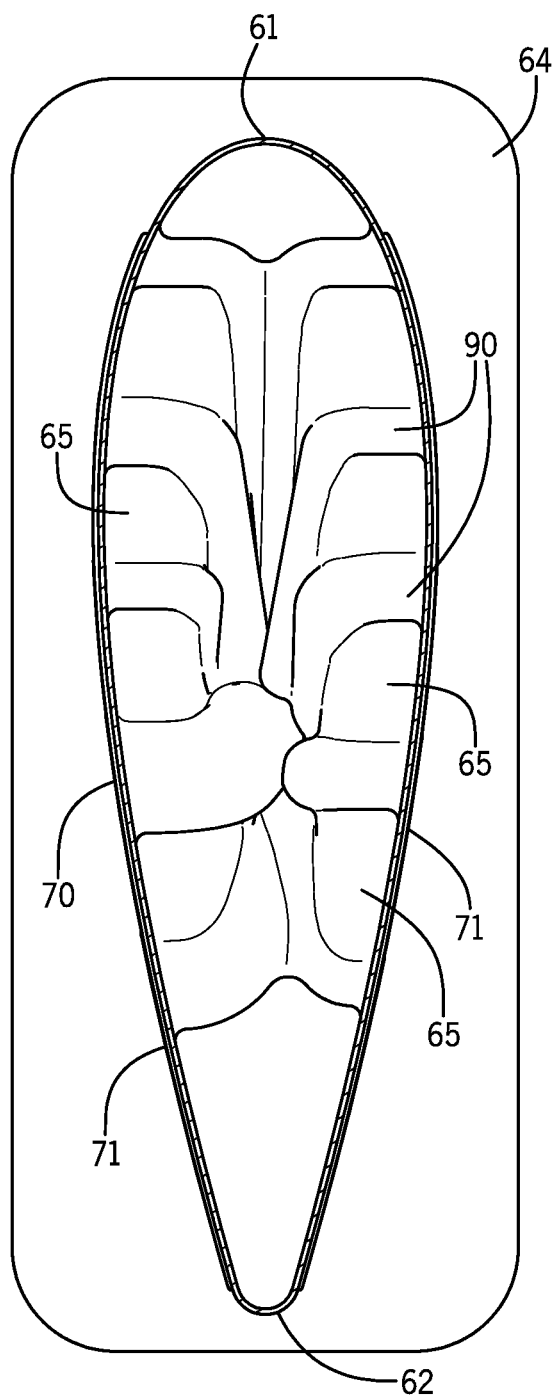
FIG. 18 is a bottom plan sectional view of the fairing according to the present invention, taken along lines 18-18 of FIG. 4, and looking in the direction of the arrows.

Fairing 60 is integrally formed with tube section 50, such that each one of the plurality of generally aligned fluid passages of tube section 50 connect to and are in fluid communication with a respective fairing drain tube 90 (as shown in FIG. 16), which fairing drain tubes 90 extend to respective fluid outlets 70 formed on the outer facing surface of left side 63L and right side 63R of fairing 60. Tube section 50 and fairing 60 are preferably additively manufactured to form a single integrated homogeneous structure. Fairing 60 incorporates fairing flange 64, as well as fairing fluid passages 90 therein. According to the present invention, fairing 60 does not comprise a substantially solid structure into which fluid passages 90 and outlets 70 are formed, but rather comprises a substantially lightweight hollow structure, as confirmed by the presence of voids 65, as illustrated in FIGS. 16 through 18. Fairing flange 64 is secured to the exterior facing surface of the engine cowling or fuselage in a substantially flush arrangement. FIGS. 14 and 15 illustrate one embodiment of the present invention in which fluid outlets 70 are positioned on both the right and left sides of the fairing 60, each having fluid ridges 71 arranged as described above.

FIG. 16 of the drawings is a cross-sectional view of fairing 60 showing a portion of tube section 50, taken along lines 16-16 of FIG. 6. It will be appreciated that while the cross-section of each fluid passage 55, as illustrated in FIG. 5, is of a generally circular cross-section, the cross-sectional shape of each corresponding fairing fluid drain tube need not retain a cross-sectional circular shape. The circular cross-sectional shapes could change as each fairing fluid drain tube transitions from a substantially vertical orientation to a substantially horizontal orientation and, in particular, as routed to achieve the staggered positioning of the respective fluid outlet 70 along each side of fairing 60, as described above. FIG. 16 further illustrates the structure of fairing 60 and the internally positioned fairing fluid drain tubes 90 and the presence of voids 65 within the interior space defining fairing 60, all towards minimizing mass and achieving significant weight savings.

FIGS. 17 and 18 are cross-sectional views taken along lines 17-17 and 18-18 of FIGS. 3 and 4 respectively. FIG. 17, in particular, illustrates the uppermost substantially vertical portion of the fairing fluid passages 90 as they transition from the tube section fluid passages 55 into fairing 60. The fairing fluid drain passages 90 associated with the two opposing uppermost positioned fluid outlets 70 are shown having a substantially non-circular cross-section reflecting the transition of these two passages to their outward outlet orientations. While having a generally non-circular cross section, the cross sectional area of each fairing fluid drain tube 90 is substantially equivalent to the cross-sectional area its corresponding fluid passageway 55. Each fairing fluid passage 90 has a peripheral surface 92 of substantially equal thickness range separating each from the other adjacent fairing fluid passages 90, as each fairing fluid passage 90 is routed to its respective fluid outlet 70—and is no longer in a common or shared wall configuration, as further illustrated in FIG. 16. FIG. 18 of the drawings further illustrates the arrangement and orientation of several fairing fluid passages 90 within fairing 60 and their respective fluid outlets 70 and positioning on opposing sides 63 L and 63R of fairing 60.

FIGS. 19 through 29 illustrate an alternative embodiment of the present integrated drain mast structure wherein fluid outlets 120 are all positioned along a single side of fairing 110, in order to minimize the risk that ground personnel inspecting an aircraft might inadvertently inspect only one side of fairing 110 and potentially overlook fluid leaking from fluid outlets 120 on the side of the fairing further from view. Elements common to the embodiments discussed above are labeled with the same reference numerals.

Figure 19:
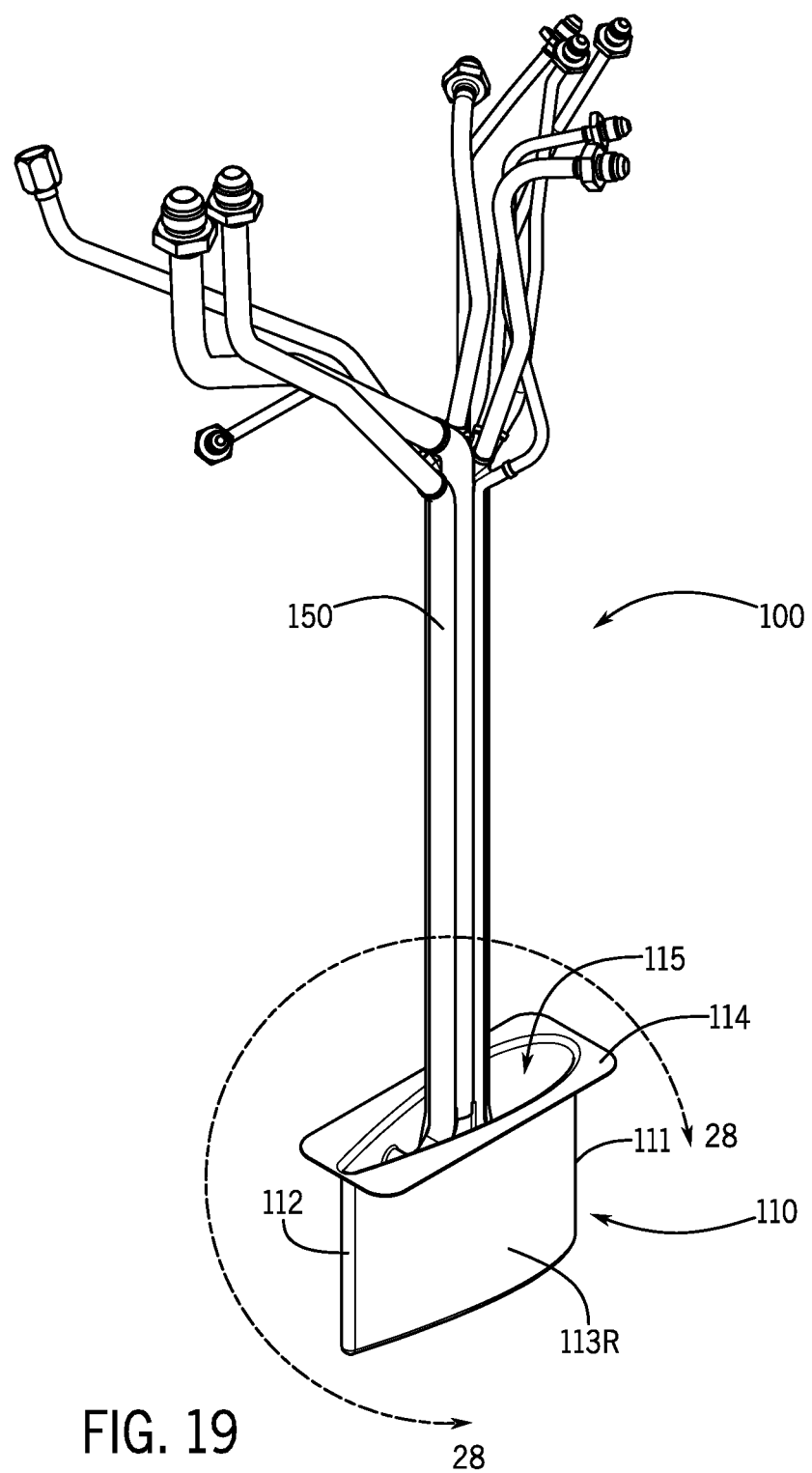
FIG. 19 is a perspective view of an integrated drain mast structure according to another embodiment of the present invention, illustrating in particular the absence of fluid outlets on the right side of the fairing.
Figure 20:
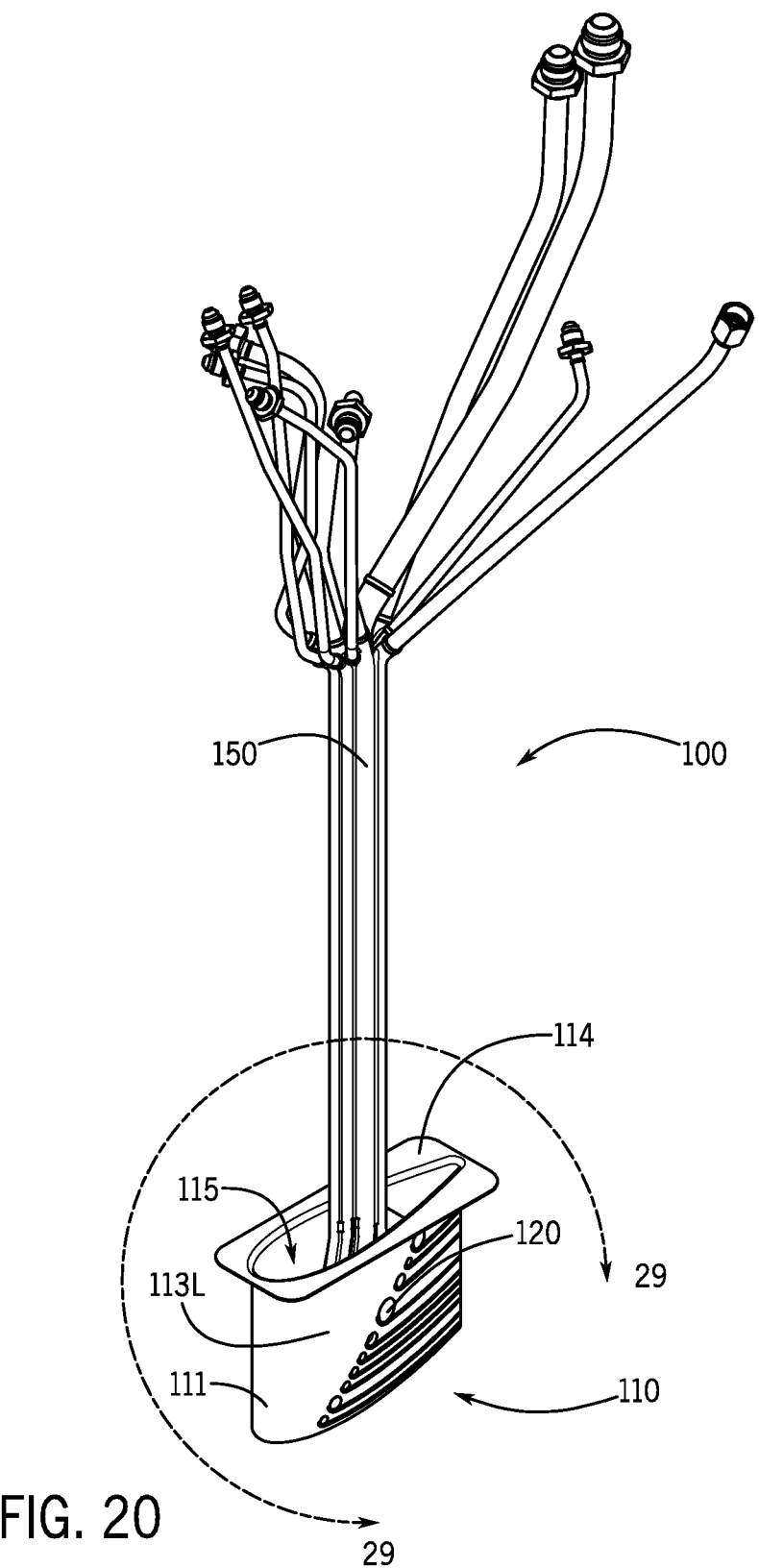
FIG. 20 is a perspective view of an integrated drain mast structure according to the embodiment of FIG. 19, illustrating in particular all of the fluid outlets being positioned on the left side of the fairing.
Figures 21, 22:
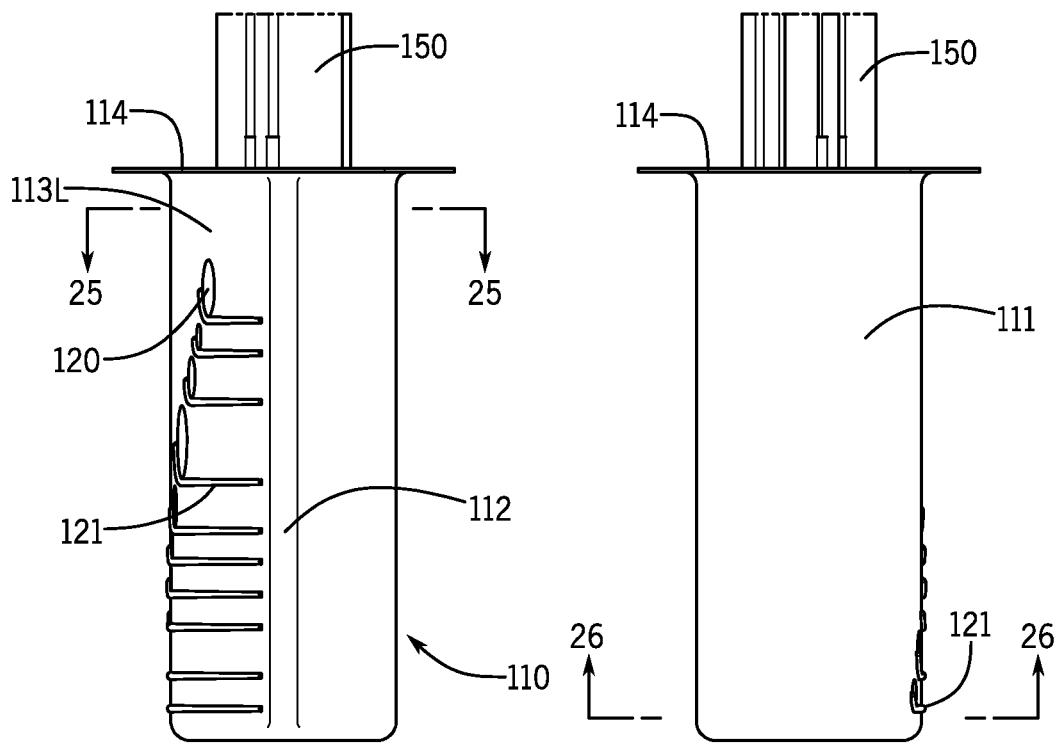
FIG. 21 is a rear elevational view of the fairing according to the embodiments of FIGS. 19 and 20.
FIG. 22 is a front elevational view of the fairing according to the embodiment of FIGS. 19 and 20.
Figure 23:
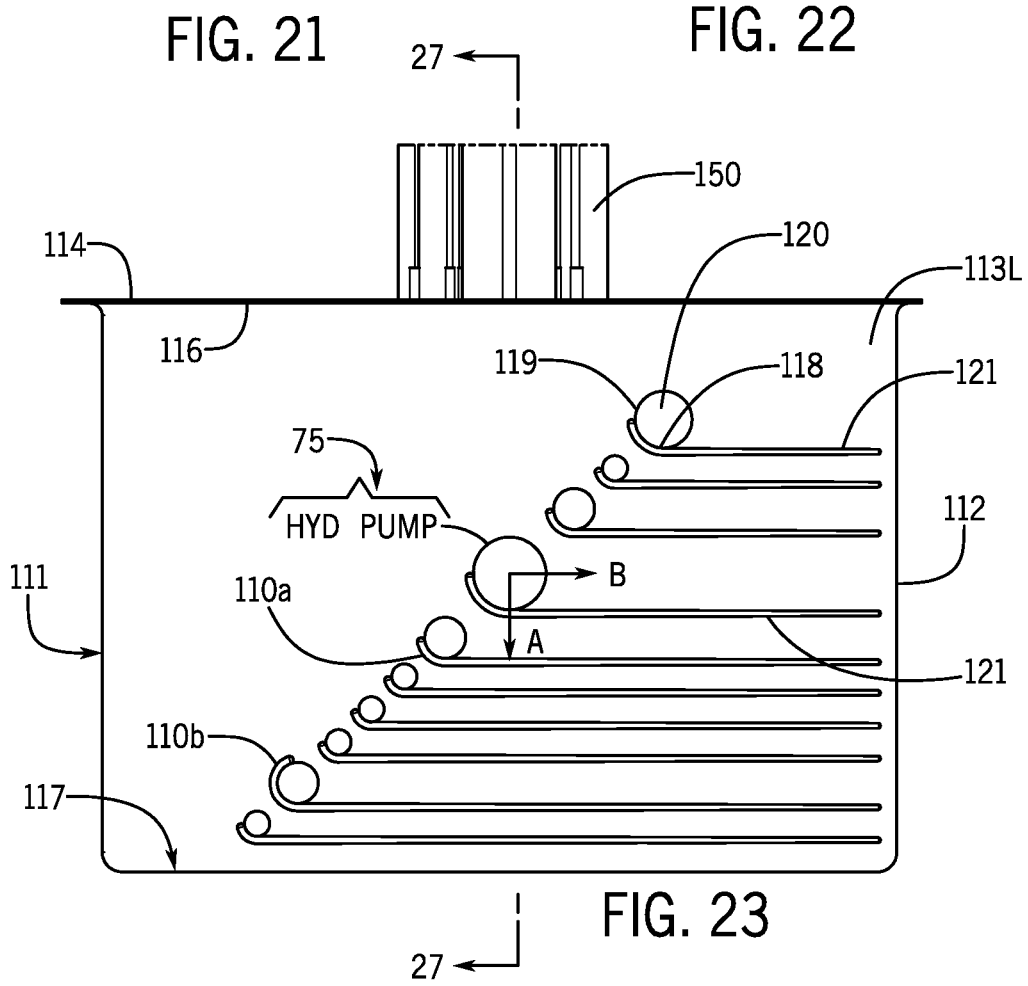
FIG. 23 is a left side elevational view of the fairing according to the embodiments of FIGS. 19 and 20.

FIGS. 19 and 20 illustrate the alternative embodiment of the integrated drain mast structure 100 wherein all fluid outlets 120 are positioned on just one side 113L of fairing 110. Substantially aerodynamic fairing 110 includes leading surface 111, trailing surface 112, and respective left side 113L and right side 113R. Fairing 110 further includes mounting flange 114, which facilitates mounting of the integrated drain mast structure to the aircraft's engine cowling or fuselage. FIGS. 21 through 23 illustrate the front, rear and left side elevational views of this other embodiment of fairing 110.

As disclosed in FIGS. 21 through 23 and FIGS. 28 and 29, fluid outlets 120 are positioned on just the left side 113L of fairing 110 in a staggered diagonal arrangement from bottom 117 to top 116 and from the leading edge 111 to the trailing edge 112 of fairing 110. Locating fluid outlets 120 in a staggered diagonal orientation along only the left side 113L of fairing 110 prevents any fluid that may leak from any single outlet from dripping downwardly in the direction of Arrow A and potentially running on to, or into, another drain outlet which could otherwise occur if the outlets 120 were oriented in a purely vertical arrangement. Moreover, staggering the position of fluid outlets 120 from bottom 117 to top 116, and from front 111 to rear 112, further enhances the ability to detect any fluid leaking from any one outlet 120, and to distinguish it from fluid leaking from any other outlet 120 and is particularly useful when a large number of outlets 120 are required. Specifically, any fluid leaking emanating from outlet 120 will be blown toward the trailing edge 112 of fairing 120 as the aircraft is in flight, as illustrated by Arrow B. Fluid emanating from any outlet 120 while the aircraft is stationary will most likely drip downward in the direction of Arrow A leaving a line or steak traceable back to one particular fluid outlet 120. Accordingly, the illustrated arrangement enhances the ability to detect from which fluid outlet 120 one or more fluids may have emanated and, in turn, diagnose which engine or fuselage component requires maintenance or repair.

To further enhance the ability to detect the fluid outlet 120 from which any one or more fluids may have leaked, fluid ridges 121 protrude outwardly from the left side 113L of fairing 120 and serve to enhance the collection of even small amounts of fluid that may emanate from a fluid outlet 120, so as to be more readily detectable by visual inspection. As in an earlier embodiment disclosed above, fluid ridges 121 are positioned immediately below each of lower edges 118 of each fluid outlet 120 and extend toward the trailing surface of fairing 112. Each fluid ridge 121 further includes a forward section 110(a) that extends along the leading edge 119 of each fluid outlet 120. In another embodiment, each fluid ridge 121 may extend even further along the leading edge of each fluid outlet 120 at ridge extension 110(b) toward the upward edge of each fluid outlet 120, to further enhance the collection of any fluid and to prevent any fluid from traveling to an adjacent ridge or fluid outlet, otherwise frustrating the ability to detect from which outlet fluid may have leaked to, in turn, identify the aircraft engine or fuselage component requiring maintenance. Fairing 110 may additionally include channels (as shown in FIGS. 8 and 9) extending from the trailing edge of each fluid outlet 110 towards the trailing surface of fairing 110 to promote the collection and retention of fluid that may emanate from any single fluid outlets 120, to further enhance the ability to visually detect leaking fluids and, in turn, identify associated engine or fuselage components requiring service or maintenance.

Figure 24:
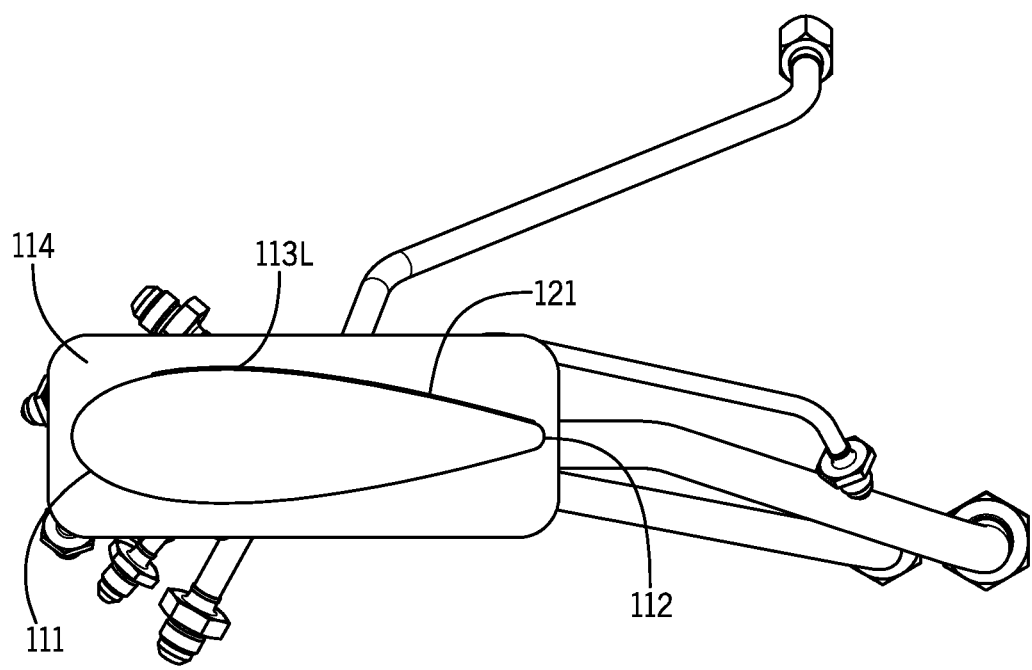
FIG. 24 is a bottom plan view of the integrated drain mast structure according to the embodiment of FIGS. 19 and 20.

FIG. 24 of the drawings is a bottom plan view of this alternative embodiment of the integrated drain mast structure shown in FIGS. 19 and 20, with fluid ridges 121 positioned on only the left side 113L of fairing 110.

Figure 25:
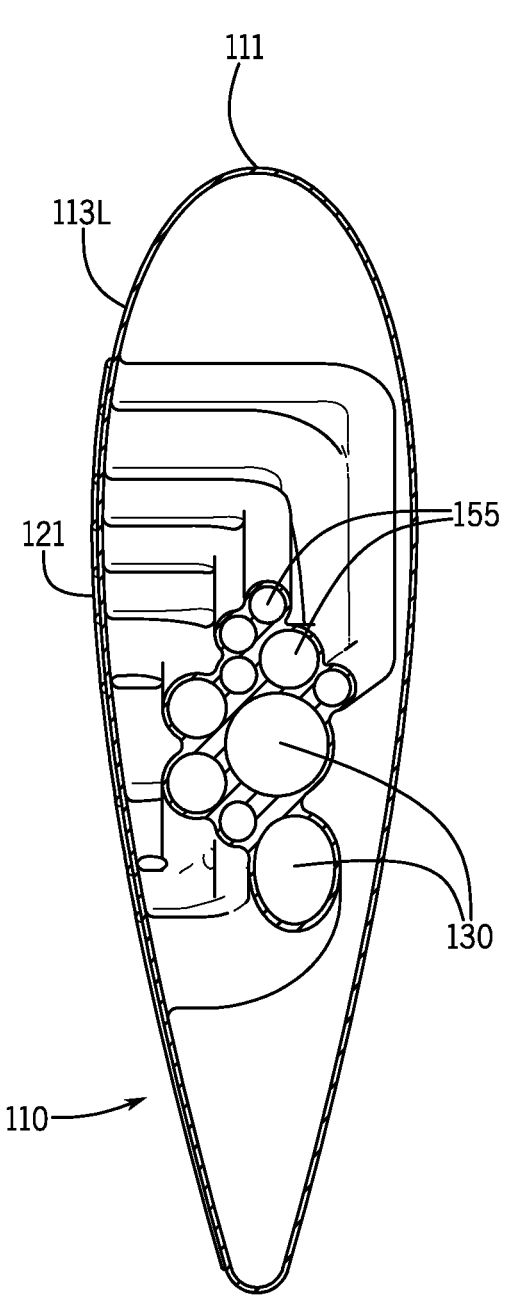
FIG. 25 is a top plan sectional view of the fairing according to the embodiment of FIGS. 19 through 21, taken along lines 25-25 of FIG. 21, and looking in the direction of the arrows.
Figure 26:
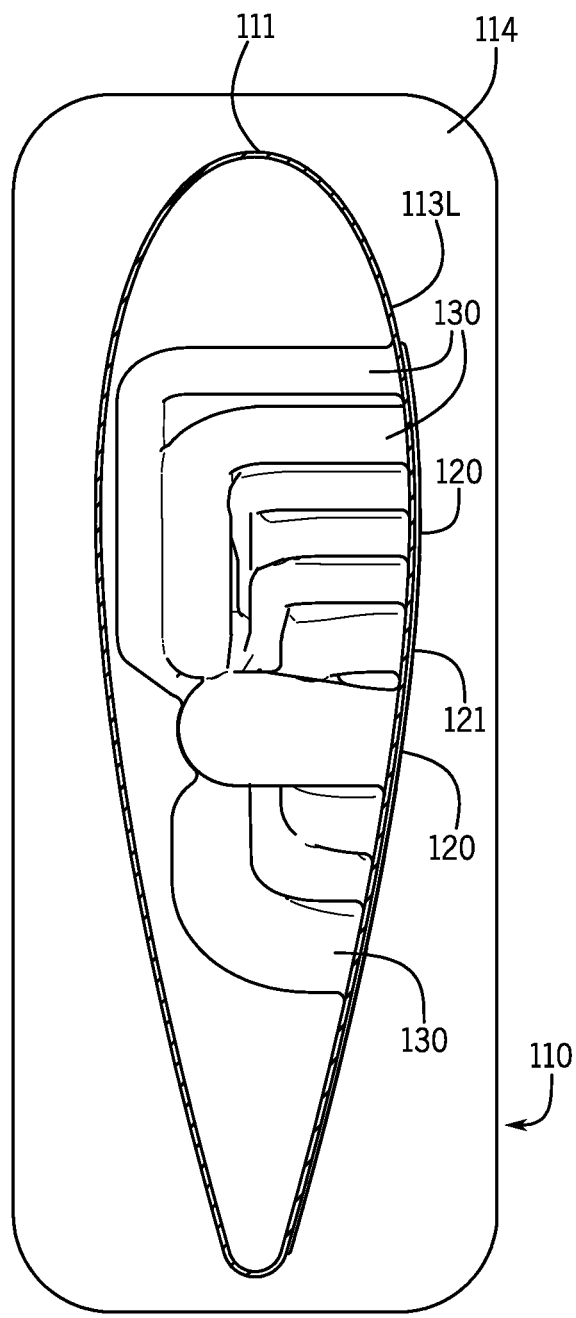
FIG. 26 is a bottom plan sectional view of the fairing according to the embodiment of FIGS. 19 through 22, taken along lines 26-26 of FIG. 22, and looking in the direction of the arrows.

FIGS. 25 and 26 are cross-sectional views of fairing 110 illustrating the vertically aligned portions of the fairing fluid passages 122 as they transition from the tube section fluid passages 155 into fairing 110 and exit along left side 113L at fluid outlets 120. FIG. 26 of the drawings further illustrates the arrangement and orientation of fairing fluid passages 130 within fairing 110 and their respective fluid outlets 120, positioned on side 113L of fairing 110.

Figure 27:
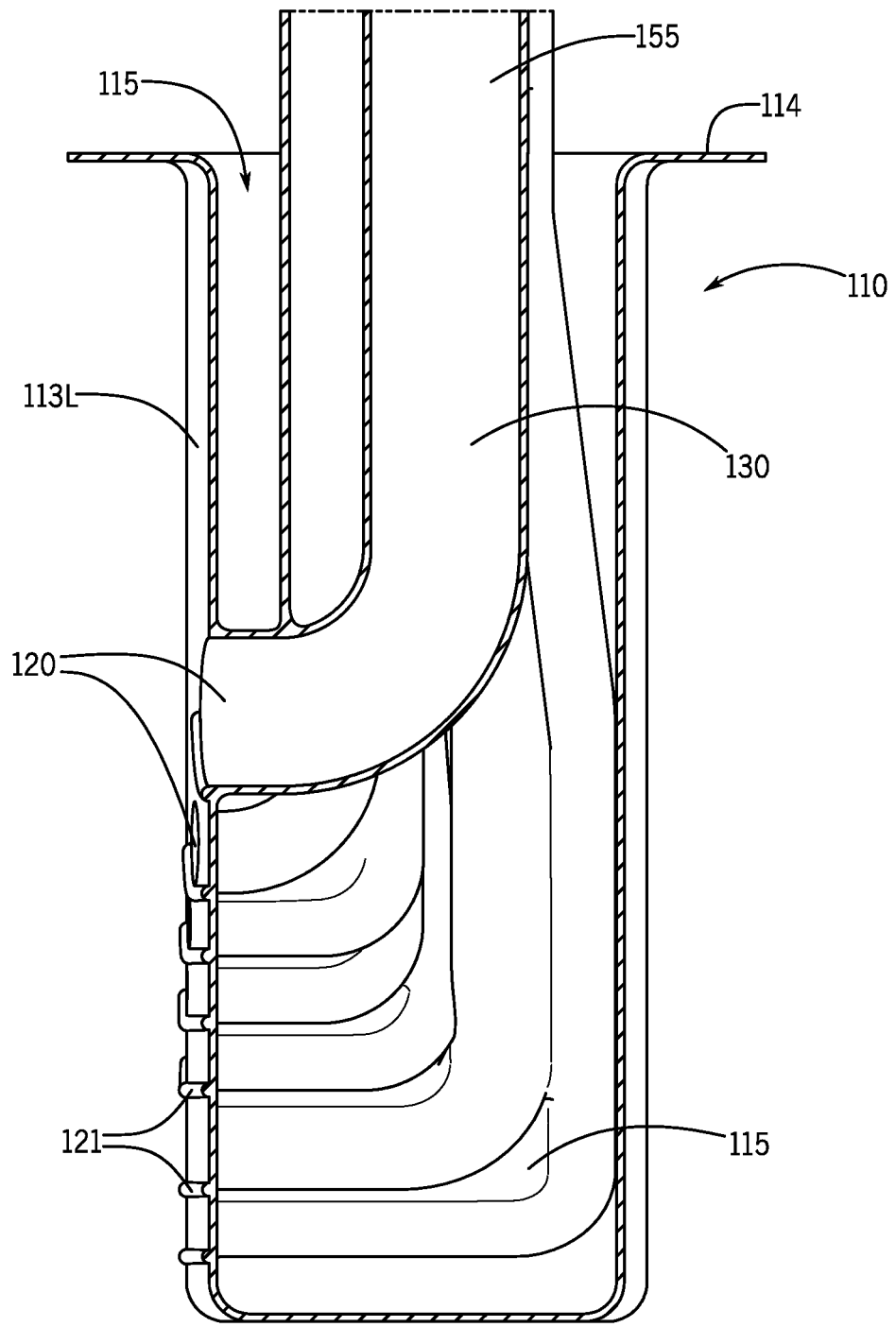
FIG. 27 is an elevated rear cross sectional view of the fairing according to another embodiment of the present invention, taken along lines 27-27 of FIG. 23, and looking in the direction of the arrows.

FIG. 27 of the drawings is a cross-sectional view of fairing 110 and a portion of tube section 155 taken along line 27-27 of FIG. 23 illustrating the structure of fairing 110 and the internally positioned fairing fluid tubes 130 and the presence of voids 115 within the interior space defining fairing 110.

Figure 28:
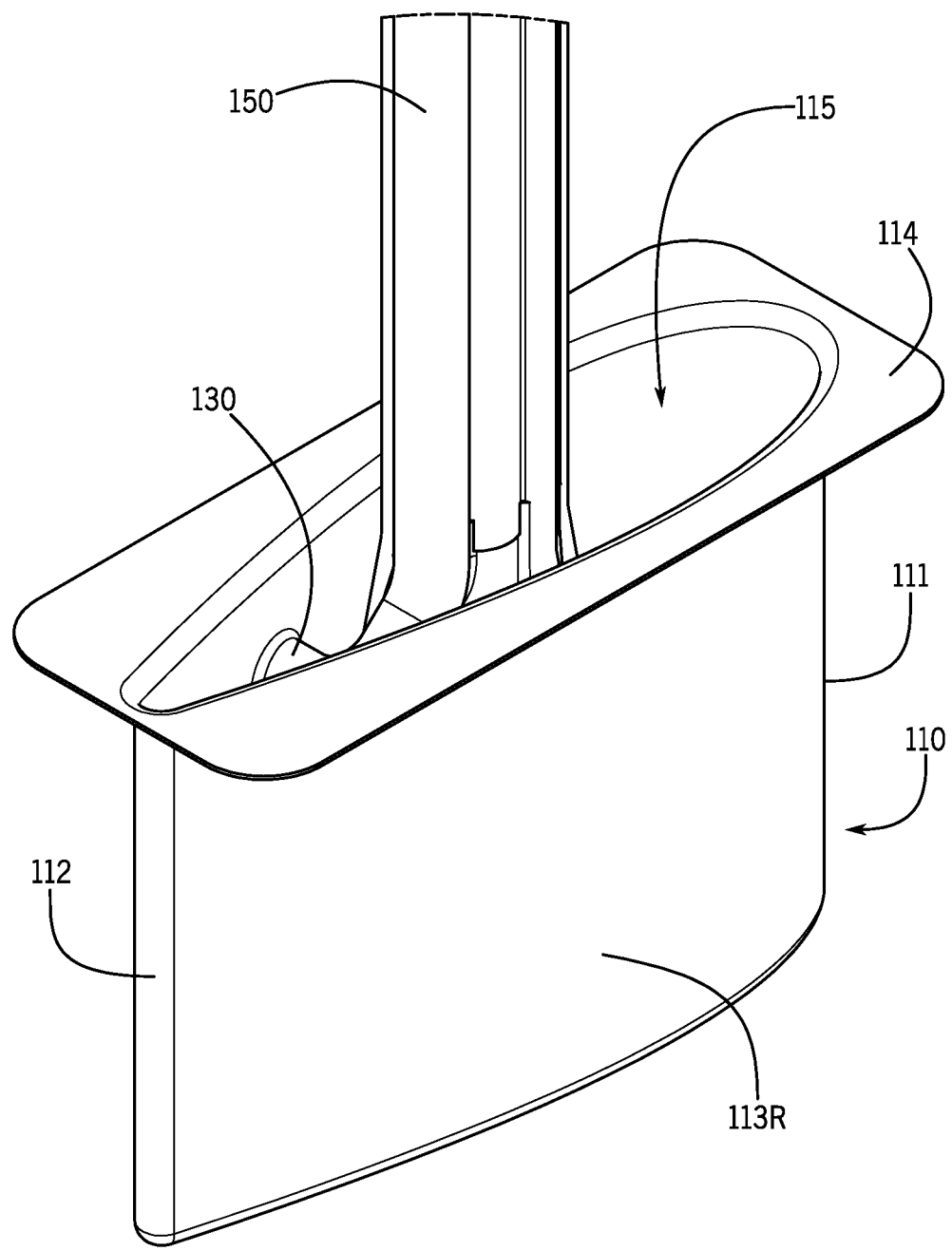
FIG. 28 is an enlarged right side perspective view of the integrated drain mast structure according to FIG. 19, illustrating in particular the absence of fluid outlets on the right side of the fairing.
Figure 29:
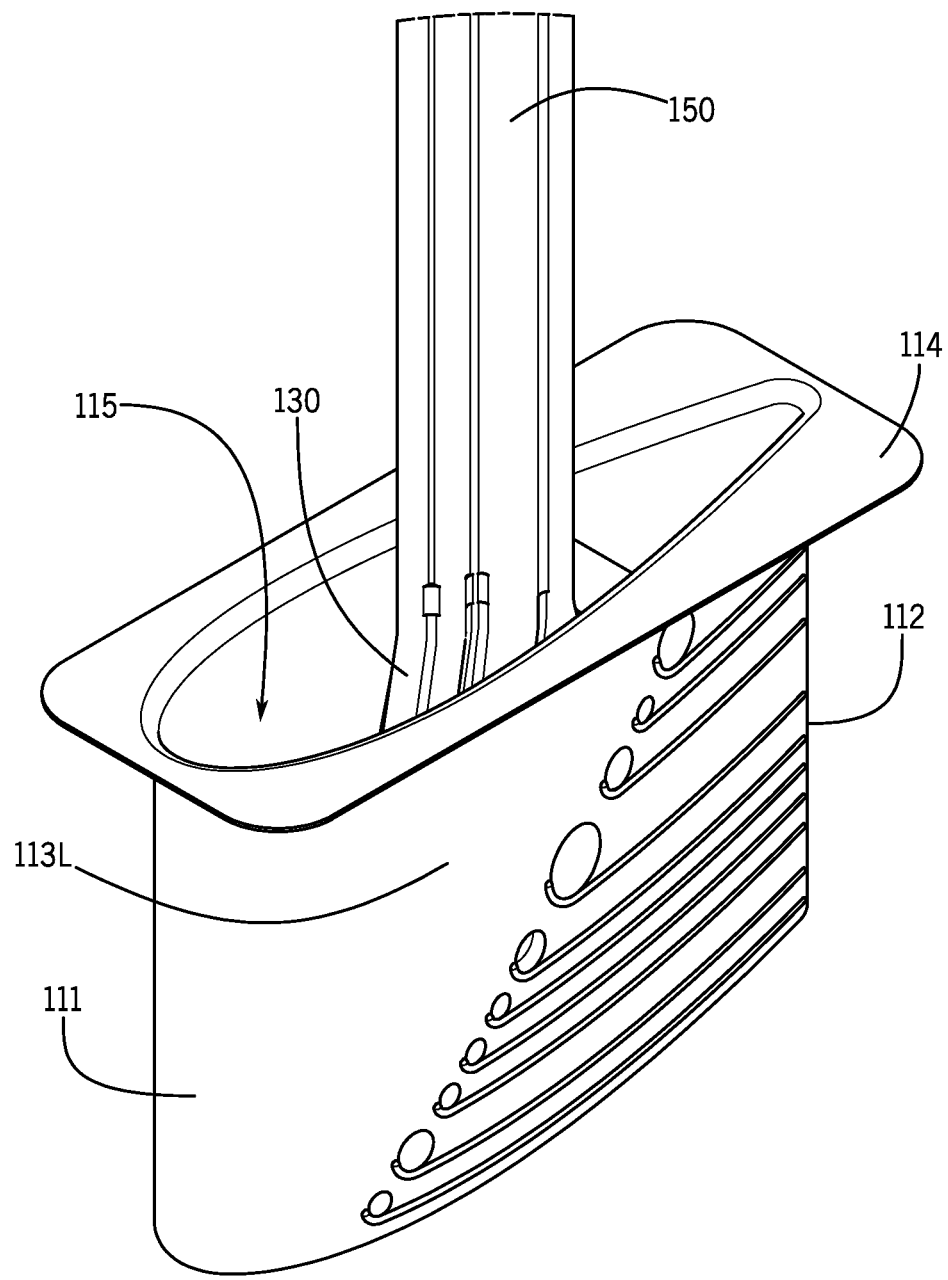
FIG. 29 is an enlarged left side perspective view of the integrated drain mast structure according to FIG. 20, illustrating in particular the presence of fluid outlets on the left side of the fairing.

FIGS. 28 and 29 disclose fluid outlets 120 positioned on just the left side 113L of fairing 110 in a staggered diagonal arrangement from bottom 117 to top 116 and from the leading edge 111 to the trailing edge 112 of fairing 110. As described above, locating fluid outlets 120 in a staggered diagonal orientation enhances the ability to detect any fluid leaking from any one outlet 120, and to distinguish it from fluid leaking from any other outlet 120 and is particularly useful when a large number of outlets 120 are required.

The present invention permits the pre-assembly of the fully integrated drain mast structure 40, 100 and associated fluid conduits toward facilitating and expediting the installation of its entirety within an aircraft.

While the present invention has been emphasized in the context of draining fluids from aircraft engine components it may similarly be applied to draining or venting fluids from components and systems located within the aircraft's pressurized fuselage, both within or outside of the cabin. For example, the present invention as disclosed herein may be adapted to collect and drain water from aircraft sink drains and/or ice storage bins.

While various aspects and implementations have been disclosed herein, other aspects and implementations will be apparent to those skilled in the art. The various aspects, embodiments and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting. Any modification, equivalent replacement, or refinement to the embodiments without departing from the spirit and the principle of the present invention shall be deemed as falling within the scope of protection of the present invention.

The invention claimed is:

1. An integrated drain mast structure for draining fluids from an aircraft enclosure, the drain mast structure comprising:
   a self-supporting tube section intended to be positioned within the aircraft, the tube section including a plurality of substantially aligned fluid passages extending from an upper end of the tube section to a lower end of the tube section,
   each fluid passage having a peripheral surface, at least a portion of which peripheral surface is common with a portion of a peripheral surface of at least one other aligned adjacent fluid passage,
   each of said fluid passages being separated from adjacent fluid passages by respective peripheral walls of a substantially equal thickness range at respective lateral positions throughout said self-supporting tube section,
   the upper end of each fluid passage within said tube section configured to be placed into fluid communication with one or more sources of fluid;
   a substantially aerodynamic fairing for positioning within an airstream and including a plurality of fairing fluid passages, each fairing fluid passage connected at an upper end of each to the lower end a respective fluid passage at a of the tube section and, at a lower end of each, to a respective fluid outlet located within the fairing,
   the cross sectional shape of said self-supporting tube section corresponding substantially to the collective width of the plurality of said substantially aligned fluid passages and their respective peripheral walls so as to minimize said cross sectional shape at a respective lateral position along said tube section; and
   the tube section and fairing comprising a single integral structure.

2. The integrated drain mast structure of claim 1 wherein the aircraft enclosure comprises an aircraft fuselage.

3. The integrated drain mast structure of claim 1 wherein respective peripheral walls separating said adjacent fluid passages are of a substantially equal thickness ranging longitudinally throughout the self-supporting tube structure.

4. The integrated drain mast structure of claim 1 wherein the lateral thickness of at least some of the respective peripheral walls separating said adjacent fluid passages toward the upper end of the tube section and the lower end of the tube section and are thicker than the lateral thickness of at least some of the respective peripheral walls separating said adjacent fluid passages in the region therebetween the upper and lower ends.

5. The integrated drain mast structure of claim 1 wherein said fluid outlets are positioned on one side of the fairing and orientated diagonally from the lower leading edge of the fairing section toward the upper trailing edge of the fairing.

6. The integrated drain mast structure of claim 1 wherein at least one fluid outlet includes indicia associated with the aircraft component and positioned adjacent thereto.

7. The integrated drain mast structure of claim 1 wherein the fluid passages within the tube section are individually sized to accommodate an amount of fluid that may be produced by a respective associated aircraft component.

8. The integrated drain mast structure of claim 1 wherein the plurality of fluid passages within the tube section are orientated with respect to one another so as to increase the tube section's resistance to external forces that may bear upon the tube section when the aircraft is in flight.

9. The integrated drain mast structure of claim 1 wherein the tube section and fairing section are additively manufactured to simultaneously form said single integrated homogeneous structure.

10. The integrated drain mast structure of claim 1 wherein the aircraft enclosure comprises an aircraft engine cowling surrounding an aircraft engine.

11. The integrated drain mast structure of claim 10 wherein the self-supporting tube section is positioned within the aircraft engine, at the lower end of an area encased by the engine cowling.

12. The integrated drain mast structure of claim 10 wherein the fairing extends from the engine cowling into the airstream.

13. The integrated drain mast structure of claim 10 wherein the fairing includes a flange that is positioned substantially flush with the exterior facing surface of the engine cowling.

14. The integrated drain mast structure of claim 10 wherein the fairing includes a flange that is positioned substantially flush with the exterior facing surface of the aircraft fuselage.

15. The integrated drain mast structure of claim 1 further including a plurality of fluid conduits each connected at one end to the upper end of a respective fluid passage within the tube section and at the other end to one or more aircraft components.

16. The integrated drain mast structure of claim 15 wherein the upper end of the tube section includes a branch structure having a plurality of passages separated from one another to facilitate their connection to a respective associated fluid conduit.

17. The integrated drain mast structure of claim 16 wherein the fluid conduits are telescopically received by the branch structure and connected thereto by brazing.

18. The integrated drain mast structure of claim 16 wherein the fluid conduits are telescopically received by the branch structure and connected thereto by welding.

19. The integrated drain mast structure of claim 16 wherein the fluid conduits are telescopically received by the branch structure and connected thereto by mechanical coupling.

20. The integrated drain mast structure of claim 1 wherein the fairing includes a leading surface, a trailing surface and opposing aerodynamic side surfaces positioned therebetween.

21. The integrated drain mast structure of claim 20 wherein at least some of said fluid outlets are positioned within both fairing side surfaces.

22. The integrated drain mast structure of claim 20 wherein the fairing includes at least one groove associated with at least one fluid outlet, the at least one groove extending from a trailing edge of at least one fluid outlet toward the trailing surface along at least one side surface of the fairing.

23. The integrated drain mast structure of claim 20 wherein the fairing includes at least one ridge associated with at least one fluid outlet, the at least one ridge positioned adjacent to a lower edge of said at least one fluid outlet and extending toward the trailing surface along at least one side surface of the fairing.

24. The integrated drain mast structure of claim 23 wherein the ridge extends from and about at least a portion of the leading edge of the at least one fluid outlet.

25. A drain mast for draining fluids from an aircraft turbine engine, the drain mast section comprising:

a self-supporting tube section intended to be positioned within the aircraft engine and encased by an engine cowling, the tube section including a plurality of substantially aligned fluid passages extending from an upper end to a lower end of the tube section each fluid passage having a peripheral surface at least a portion of which is common with at least a portion of an adjacent, aligned fluid passage, the upper end of each fluid passage configured to be in fluid communication with one or more turbine engine components;

a substantially aerodynamic fairing extending from the outer surface of the aircraft engine cowling, the fairing including a plurality of fairing fluid passages each of which is connected at one of each end to a respective fluid passage and at the other end of each to a respective one of a plurality of fluid outlets located in the fairing, and the cross sectional shape of said self-supporting tube section corresponding substantially to the collective width of the plurality of said substantially aligned fluid passages and their respective lateral peripheral walls so as to minimize said cross sectional shape at a respective position along said tube section.

* * * * *